United States Patent
Metwaly Saad et al.

(10) Patent No.: US 12,356,385 B2
(45) Date of Patent: Jul. 8, 2025

(54) RADIO FREQUENCY SENSING ASSISTED WIRELESS COMMUNICATION

(71) Applicant: QUALCOMM Incorporated, San Diego, CA (US)

(72) Inventors: Hussein Metwaly Saad, San Diego, CA (US); Xiaoxin Zhang, Sunnyvale, CA (US); Peerapol Tinnakornsrisuphap, San Diego, CA (US); Simone Merlin, San Diego, CA (US); Prashanth Haridas Hande, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 364 days.

(21) Appl. No.: 17/654,208

(22) Filed: Mar. 9, 2022

(65) Prior Publication Data

US 2023/0309077 A1 Sep. 28, 2023

(51) Int. Cl.
*H04W 72/044* (2023.01)

(52) U.S. Cl.
CPC ................................. *H04W 72/046* (2013.01)

(58) Field of Classification Search
None
See application file for complete search history.

(56) References Cited

U.S. PATENT DOCUMENTS

| 7,873,371 | B2* | 1/2011 | Oberg | G05B 19/4185 |
| | | | | 455/414.3 |
| 10,812,125 | B1* | 10/2020 | Badic | H04W 72/542 |
| 2005/0266799 | A1* | 12/2005 | Hara | H04B 7/0617 |
| | | | | 455/562.1 |
| 2014/0133298 | A1* | 5/2014 | Han | H04W 28/02 |
| | | | | 370/230 |
| 2015/0011188 | A1* | 1/2015 | Chou | H04M 1/663 |
| | | | | 455/411 |
| 2015/0365860 | A1* | 12/2015 | Yu | H04W 36/22 |
| | | | | 455/444 |
| 2015/0365868 | A1* | 12/2015 | Chang | H04W 48/06 |
| | | | | 370/230 |
| 2017/0311362 | A1* | 10/2017 | Hong | H04W 36/0085 |
| 2018/0220474 | A1* | 8/2018 | Laselva | H04W 28/0865 |
| 2019/0028930 | A1* | 1/2019 | Zhang | H04W 28/16 |
| 2019/0132713 | A1* | 5/2019 | Xu | H04M 15/49 |
| 2019/0174337 | A1* | 6/2019 | Prasad | H04L 41/0668 |
| 2020/0076488 | A1* | 3/2020 | Brunel | H04B 7/063 |
| 2021/0058131 | A1* | 2/2021 | Zhu | H04B 7/063 |
| 2021/0289037 | A1* | 9/2021 | Quade | H04M 3/30 |
| 2022/0014933 | A1* | 1/2022 | Moon | H04W 16/225 |

* cited by examiner

*Primary Examiner* — Lonnie V Sweet
(74) *Attorney, Agent, or Firm* — Harrity & Harrity, LLP

(57) ABSTRACT

Various aspects of the present disclosure generally relate to wireless communication. In some aspects, a user equipment (UE) may obtain radio frequency (RF) sensing information indicating at least one of movement information associated with the UE or environment information associated with the UE. The UE may communicate, with a network entity, using a communication parameter that is based at least in part on the RF sensing information. Numerous other aspects are described.

30 Claims, 13 Drawing Sheets

RADIO FREQUENCY SENSING ASSISTED WIRELESS COMMUNICATION

FIELD OF THE DISCLOSURE

Aspects of the present disclosure generally relate to wireless communication and to techniques and apparatuses for radio frequency (RF) sensing assisted wireless communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to obtain radio frequency (RF) sensing information indicating at least one of movement information associated with the UE or environment information associated with the UE. The one or more processors may be configured to communicate, with a network entity, using a communication parameter that is based at least in part on the RF sensing information.

Some aspects described herein relate to a device for wireless communication. The device may include a memory and one or more processors coupled to the memory. The one or more processors may be configured to perform RF sensing to obtain RF sensing information associated with an environment of a UE, wherein the RF sensing information indicates at least one of movement information associated with the UE or environment information associated with the UE. The one or more processors may be configured to transmit, to the UE or a network entity, the RF sensing information to facilitate communication management between the UE and the network entity.

Some aspects described herein relate to a method of wireless communication performed by a UE. The method may include obtaining RF sensing information indicating at least one of movement information associated with the UE or environment information associated with the UE. The method may include communicating, with a network entity, using a communication parameter that is based at least in part on the RF sensing information.

Some aspects described herein relate to a method of wireless communication performed by a device. The method may include performing RF sensing to obtain RF sensing information associated with an environment of a UE, wherein the RF sensing information indicates at least one of movement information associated with the UE or environment information associated with the UE. The method may include transmitting, to the UE or a network entity, the RF sensing information to facilitate communication management between the UE and the network entity.

Some aspects described herein relate to a non-transitory computer-readable medium that stores a set of instructions for wireless communication by a UE. The set of instructions, when executed by one or more processors of the UE, may cause the UE to obtain RF sensing information indicating at least one of movement information associated with the UE or environment information associated with the UE. The set of instructions, when executed by one or more processors of the UE, may cause the UE to communicate, with a network entity, using a communication parameter that is based at least in part on the RF sensing information.

Some aspects described herein relate to a non-transitory computer-readable medium that stores a set of instructions for wireless communication by a device. The set of instructions, when executed by one or more processors of the device, may cause the device to perform RF sensing to obtain RF sensing information associated with an environment of a UE, wherein the RF sensing information indicates at least one of movement information associated with the UE or environment information associated with the UE. The set of instructions, when executed by one or more processors of the device, may cause the device to transmit, to the UE or a network entity, the RF sensing information to facilitate communication management between the UE and the network entity.

Some aspects described herein relate to an apparatus for wireless communication. The apparatus may include means for obtaining RF sensing information indicating at least one of movement information associated with the apparatus or environment information associated with the apparatus. The apparatus may include means for communicating, with a network entity, using a communication parameter that is based at least in part on the RF sensing information.

Some aspects described herein relate to an apparatus for wireless communication. The apparatus may include means for performing RF sensing to obtain RF sensing information associated with an environment of a UE, wherein the RF sensing information indicates at least one of movement information associated with the UE or environment information associated with the UE. The apparatus may include means for transmitting, to the UE or a network entity, the RF sensing information to facilitate communication management between the UE and the network entity.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
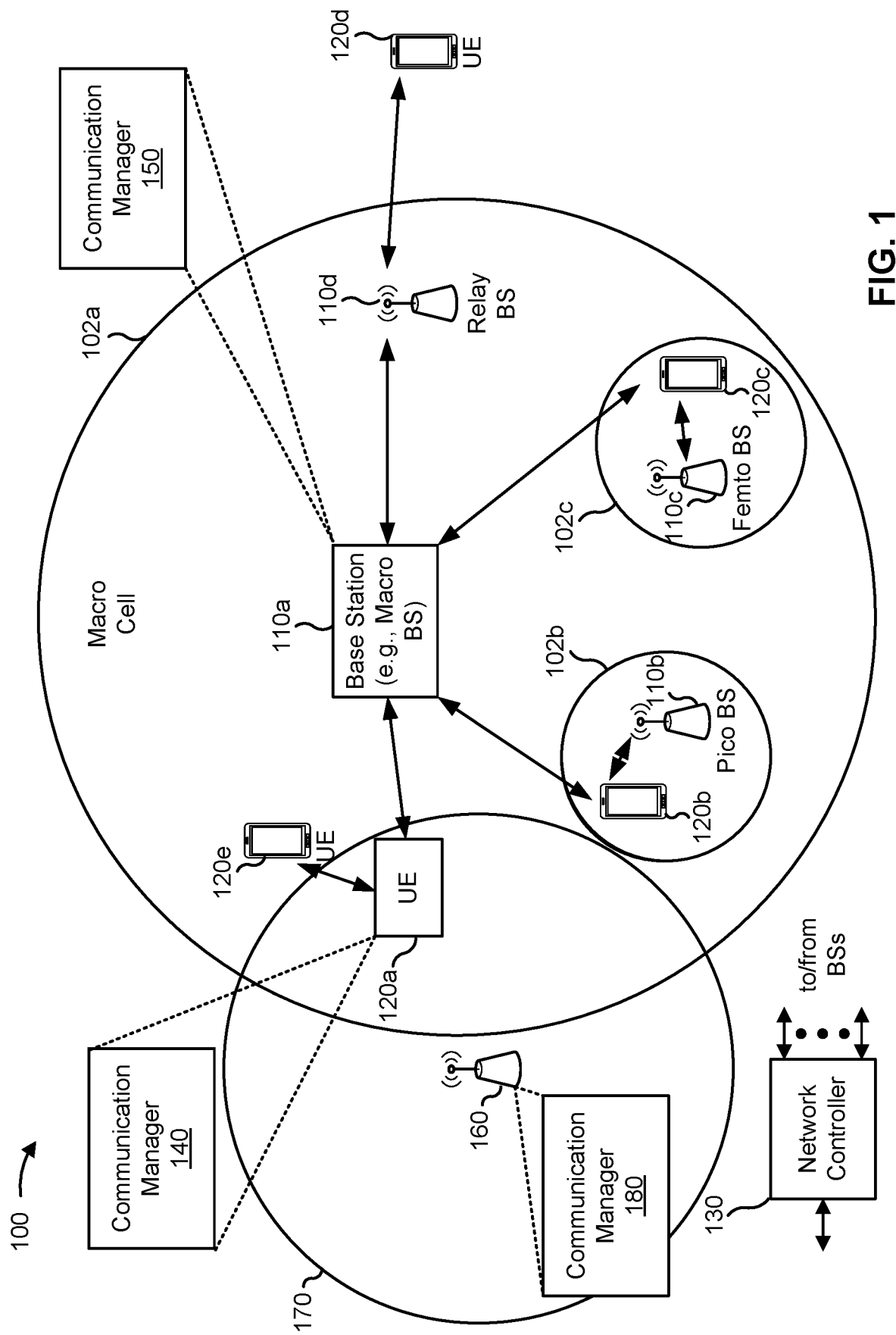
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHZ-7.125 GHZ) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHZ), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or May be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As shown in FIG. 1, the UE 120 (e.g., the UE 120a) may also communicate with a sensing device 160. The sensing device 160 may support a cell 170. The cell 170 may be associated with a wireless local area network (WLAN). The sensing device 160 may be a WLAN access point, a UE 120, a base station 110, a CU, a DU, an RU, an IAB node, or another device. The sensing device may be capable of performing RF sensing, as described in more detail elsewhere herein.

In some aspects, the UE 120 may include a communication manager 140. As described in more detail elsewhere herein, the communication manager 140 may obtain RF sensing information indicating at least one of movement information associated with the UE or environment information associated with the UE; and communicate, with a network entity, using a communication parameter that is based at least in part on the RF sensing information. Additionally, or alternatively, the communication manager 140 may perform one or more other operations described herein.

In some aspects, the base station 110 may include a communication manager 150. As described in more detail elsewhere herein, the communication manager 150 may receive, from a UE or a sensing device, RF sensing information indicating at least one of movement information associated with the UE or environment information associated with the UE; and communicate, with the UE, using a communication parameter that is based at least in part on the RF sensing information. Additionally, or alternatively, the communication manager 150 may perform one or more other operations described herein.

In some aspects, the sensing device 160 may include a communication manager 180. As described in more detail elsewhere herein, the communication manager 180 may perform RF sensing to obtain RF sensing information associated with an environment of a UE, wherein the RF sensing information indicates at least one of movement information associated with the UE or environment information associated with the UE; and transmit, to the UE or a network entity, the RF sensing information to facilitate communication management between the UE and the network entity. Additionally, or alternatively, the communication manager 180 may perform one or more other operations described herein.

As indicated above, FIG. 1 is provided as an example. Other examples may differ from what is described with regard to FIG. 1.

Figure 2:
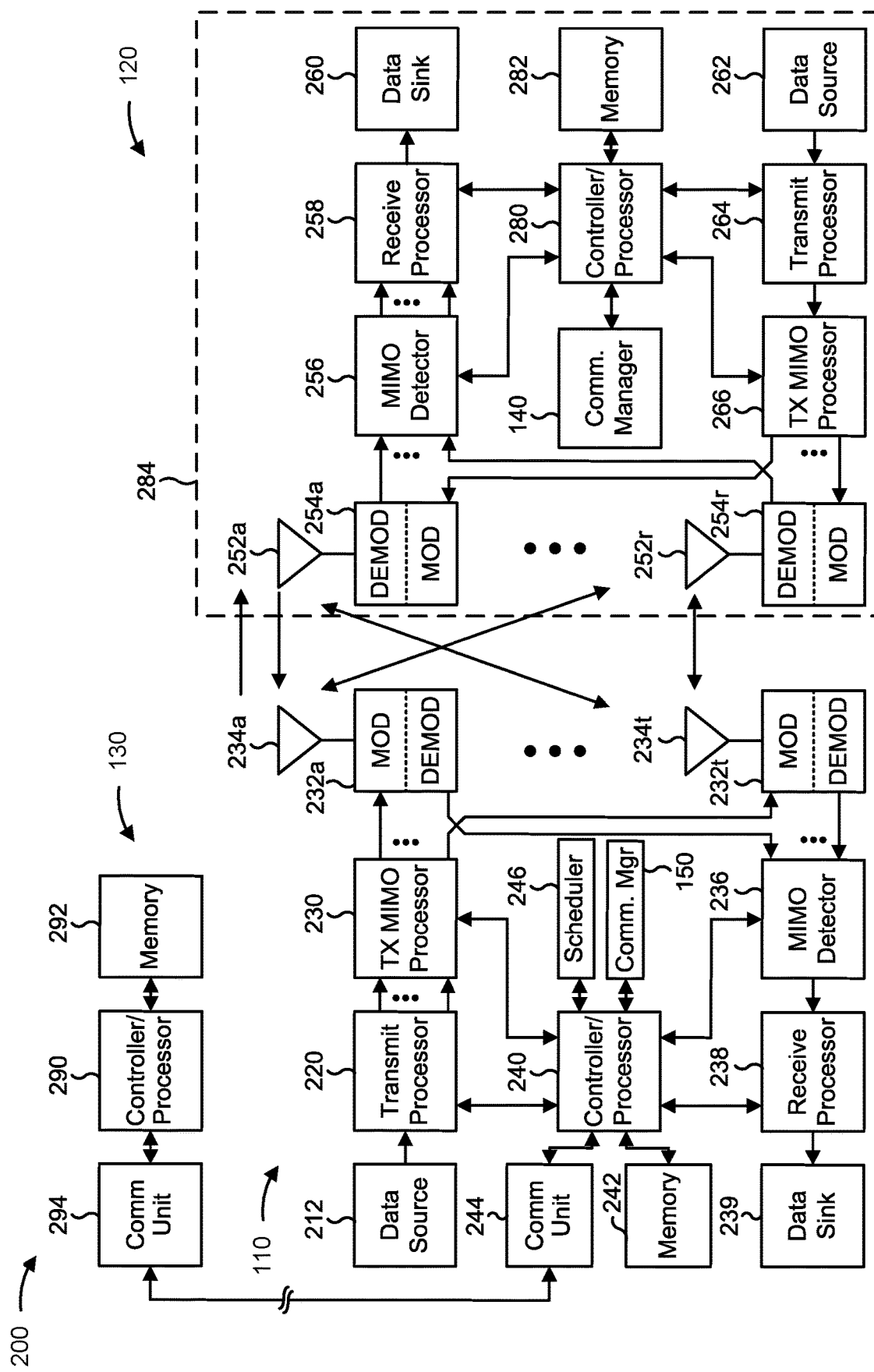
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-13).

The controller/processor 240 of the base station 110, the controller/processor 280 of the UE 120, and/or any other component(s) of FIG. 2 may perform one or more techniques associated with RF sensing assisted wireless communication, as described in more detail elsewhere herein. In some aspects, the sensing device described herein may be the UE 120, or may include one or more components of the UE 120 shown in FIG. 2. Alternatively, the sensing device described herein may be an access point (e.g., a WLAN access point), among other examples.

Figure 9:
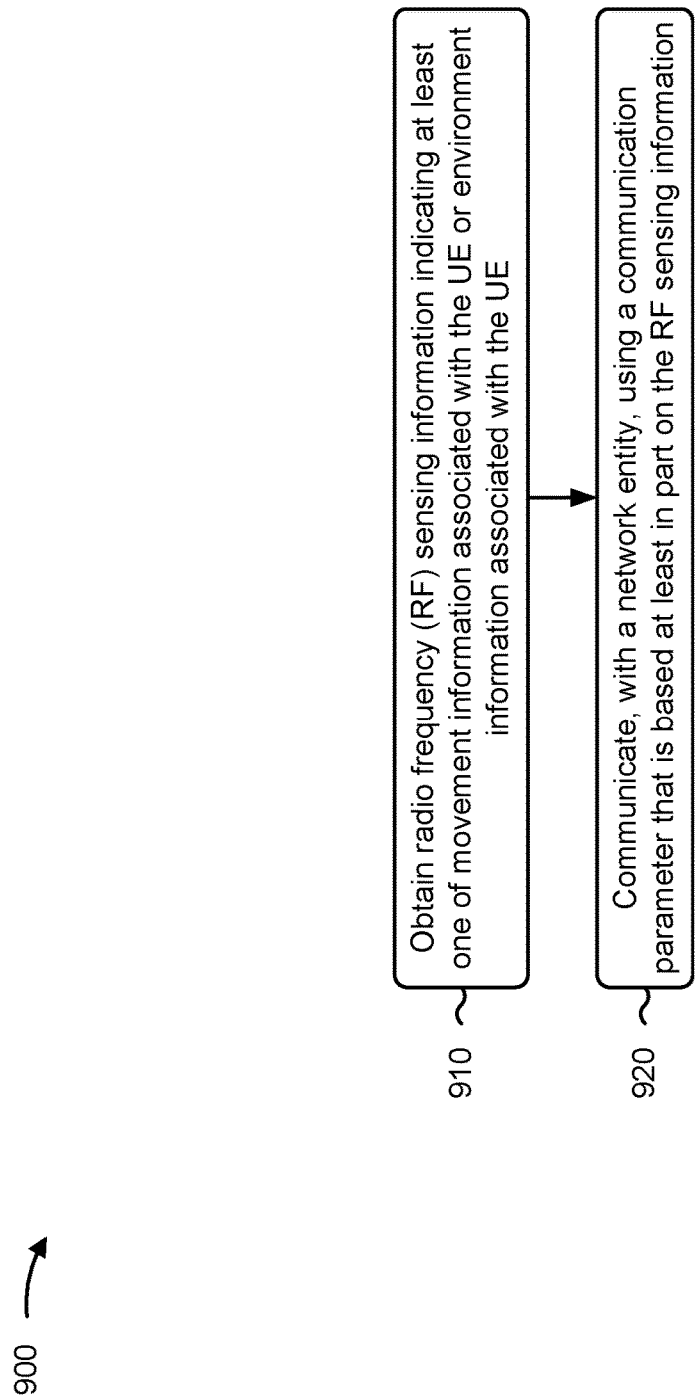
FIG. 9 is a diagram illustrating an example process performed, for example, by a UE, in accordance with the present disclosure.
Figure 10:
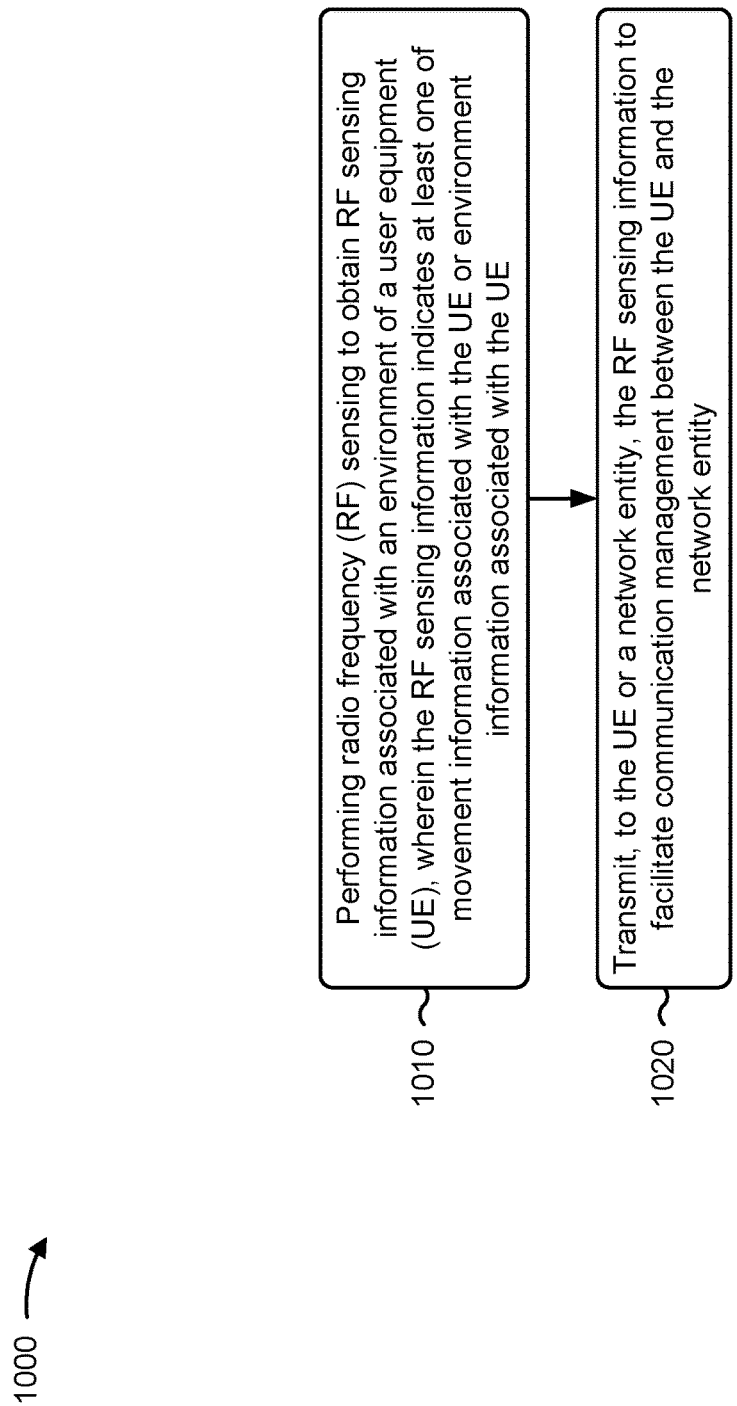
FIG. 10 is a diagram illustrating an example process performed, for example, by a device, in accordance with the present disclosure.

For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE 120 includes means for obtaining RF sensing information indicating at least one of movement information associated with the UE 120 or environment information associated with the UE 120; and/or means for communicating, with a network entity, using a communication parameter that is based at least in part on the RF sensing information. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the sensing device 160 includes means for performing RF sensing to obtain RF sensing information associated with an environment of a UE, wherein the RF sensing information indicates at least one of movement information associated with the UE or environment information associated with the UE; and/or means for transmitting, to the UE or a network entity, the RF sensing information to facilitate communication management between the UE and the network entity. In some aspects, the means for the sensing device 160 to perform operations described herein may include, for example, one or more of communication manager 180 and/or components similar to transmit processor 220, TX MIMO processor 230, modem 232, antenna 234, MIMO detector 236, receive processor 238, controller/processor 240, memory 242, or scheduler 246. In some other aspects, the means for the sensing device 160 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station.

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as a CU, one or more DUs, or one or more RUs). In some examples, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
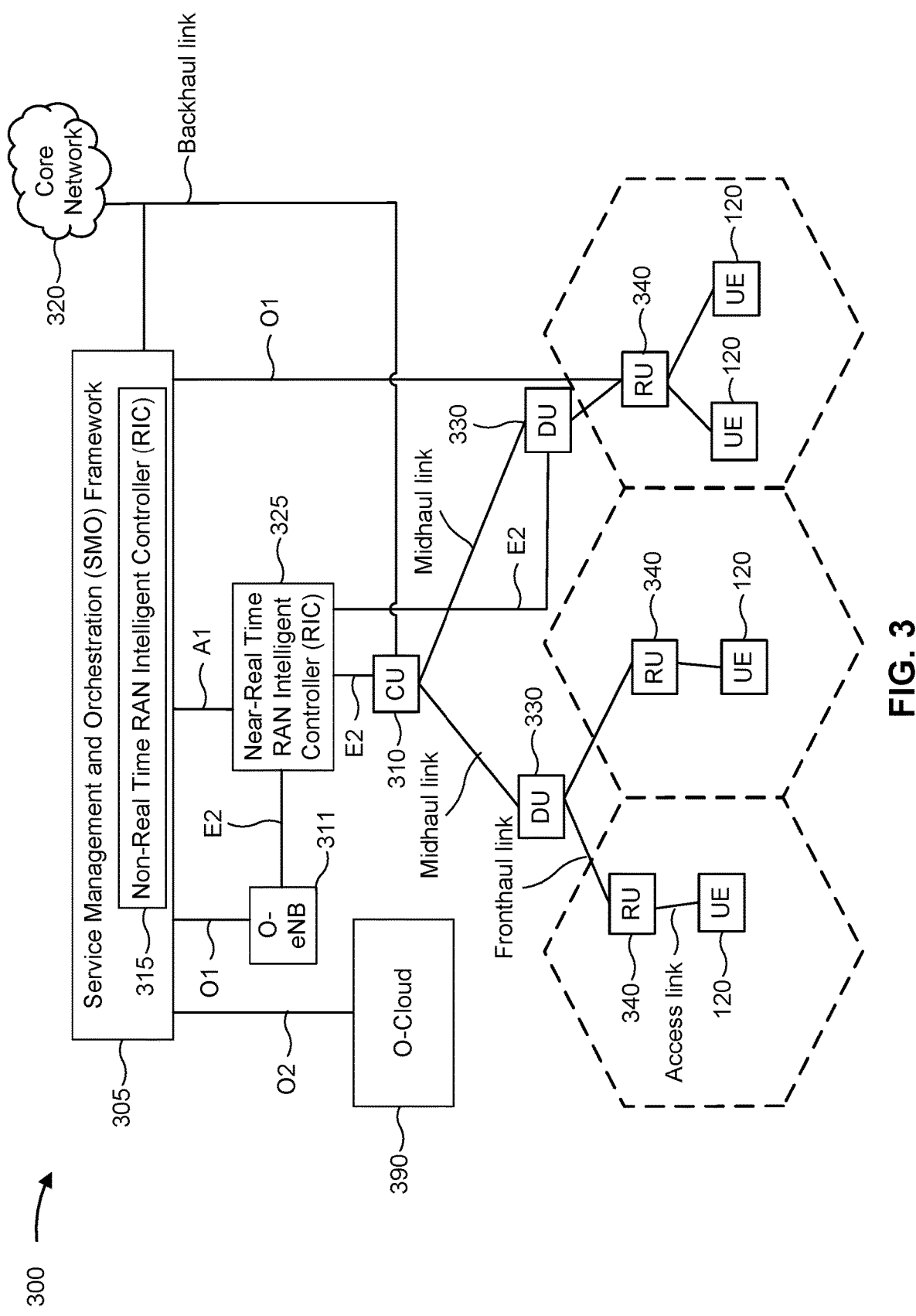
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective RF access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples.

In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which may also be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts radio frequency (RF) processing functions or low-PHY layer functions, such as performing an FFT, performing an iFFT, digital beamforming, or PRACH extraction and filtering, among other examples, based at least in part on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
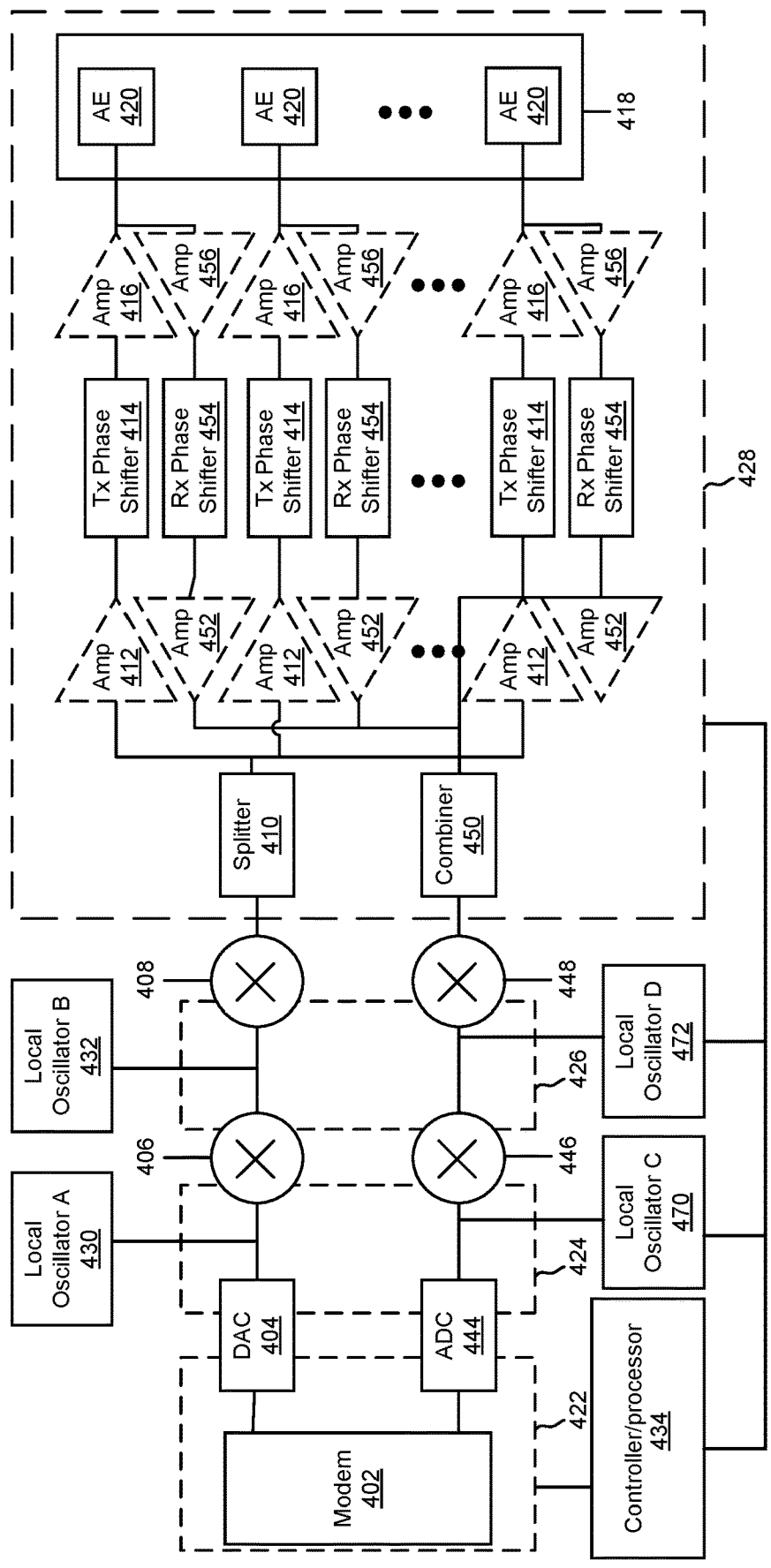
FIG. 4 is a diagram illustrating an example beamforming architecture that supports beamforming for millimeter wave (mmW) communications, in accordance with the present disclosure.

FIG. 4 is a diagram illustrating an example beamforming architecture 400 that supports beamforming for millimeter wave (mmW) communications, in accordance with the present disclosure. In some aspects, architecture 400 may implement aspects of the wireless network 100 and/or the disaggregated base station architecture 300. In some aspects, architecture 400 may be implemented in a transmitting device (e.g., a first wireless communication device, UE, a network entity, a CU, a DU, and RU, or base station) and/or a receiving device (e.g., a second wireless communication device, UE, a network entity, a CU, a DU, and RU, or base station), as described herein.

Broadly, FIG. 4 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 400 includes a modem (modulator/demodulator) 402, a digital to analog converter (DAC) 404, a first mixer 406, a second mixer 408, and a splitter 410. The architecture 400 also includes multiple first amplifiers 412, multiple phase shifters 414, multiple second amplifiers 416, and an antenna array 418 that includes multiple antenna elements 420. In some examples, the modem 402 may be one or more of the modems 232 or modems 254 described in connection with FIG. 2.

Transmission lines or other waveguides, wires, and/or traces are shown connecting the various components to illustrate how signals to be transmitted may travel between components. Reference numbers 422, 424, 426, and 428 indicate regions in the architecture 400 in which different types of signals travel or are processed. Specifically, reference number 422 indicates a region in which digital baseband signals travel or are processed, reference number 424 indicates a region in which analog baseband signals travel or are processed, reference number 426 indicates a region in which analog intermediate frequency (IF) signals travel or are processed, and reference number 428 indicates a region in which analog RF signals travel or are processed. The architecture also includes a local oscillator A 430, a local oscillator B 432, and a controller/processor 434. In some aspects, controller/processor 434 corresponds to controller/processor 240 of the base station described above in connection with FIG. 2 and/or controller/processor 280 of the UE described above in connection with FIG. 2.

Each of the antenna elements 420 may include one or more sub-elements for radiating or receiving RF signals. For example, a single antenna element 420 may include a first sub-element cross-polarized with a second sub-element that can be used to independently transmit cross-polarized signals. The antenna elements 420 may include patch antennas, dipole antennas, or other types of antennas arranged in a linear pattern, a two dimensional pattern, or another pattern. A spacing between antenna elements 420 may be such that signals with a desired wavelength transmitted separately by the antenna elements 420 may interact or interfere (e.g., to form a desired beam). For example, given an expected range of wavelengths or frequencies, the spacing may provide a quarter wavelength, half wavelength, or other fraction of a wavelength of spacing between neighboring antenna elements 420 to allow for interaction or interference of signals transmitted by the separate antenna elements 420 within that expected range.

The modem 402 processes and generates digital baseband signals and may also control operation of the DAC 404, first and second mixers 406, 408, splitter 410, first amplifiers 412, phase shifters 414, and/or the second amplifiers 416 to transmit signals via one or more or all of the antenna elements 420. The modem 402 may process signals and control operation in accordance with a communication standard such as a wireless standard discussed herein. The DAC 404 may convert digital baseband signals received from the modem 402 (and that are to be transmitted) into analog baseband signals. The first mixer 406 upconverts analog baseband signals to analog IF signals within an IF using a local oscillator A 430. For example, the first mixer 406 may mix the signals with an oscillating signal generated by the local oscillator A 430 to "move" the baseband analog signals to the IF. In some cases, some processing or filtering (not shown) may take place at the IF. The second mixer 408 upconverts the analog IF signals to analog RF signals using the local oscillator B 432. Similar to the first mixer, the second mixer 408 may mix the signals with an oscillating signal generated by the local oscillator B 432 to "move" the IF analog signals to the RF or the frequency at which signals will be transmitted or received. The modem 402 and/or the controller/processor 434 may adjust the frequency of local oscillator A 430 and/or the local oscillator B 432 so that a desired IF and/or RF frequency is produced and used to facilitate processing and transmission of a signal within a desired bandwidth.

In the illustrated architecture 400, signals upconverted by the second mixer 408 are split or duplicated into multiple signals by the splitter 410. The splitter 410 in architecture 400 splits the RF signal into multiple identical or nearly identical RF signals. In other examples, the split may take place with any type of signal, including with baseband digital, baseband analog, or IF analog signals. Each of these signals may correspond to an antenna element 420, and the signal travels through and is processed by amplifiers 412, 416, phase shifters 414, and/or other elements corresponding to the respective antenna element 420 to be provided to and transmitted by the corresponding antenna element 420 of the antenna array 418. In one example, the splitter 410 may be an active splitter that is connected to a power supply and provides some gain so that RF signals exiting the splitter 410 are at a power level equal to or greater than the signal entering the splitter 410. In another example, the splitter 410 is a passive splitter that is not connected to power supply and the RF signals exiting the splitter 410 may be at a power level lower than the RF signal entering the splitter 410.

After being split by the splitter 410, the resulting RF signals may enter an amplifier, such as a first amplifier 412, or a phase shifter 414 corresponding to an antenna element 420. The first and second amplifiers 412, 416 are illustrated with dashed lines because one or both of them might not be necessary in some aspects. In some aspects, both the first amplifier 412 and second amplifier 416 are present. In some aspects, neither the first amplifier 412 nor the second amplifier 416 is present. In some aspects, one of the two amplifiers 412, 416 is present but not the other. By way of example, if the splitter 410 is an active splitter, the first amplifier 412 may not be used. By way of further example, if the phase shifter 414 is an active phase shifter that can provide a gain, the second amplifier 416 might not be used.

The amplifiers 412, 416 may provide a desired level of positive or negative gain. A positive gain (positive dB) may be used to increase an amplitude of a signal for radiation by a specific antenna element 420. A negative gain (negative dB) may be used to decrease an amplitude and/or suppress radiation of the signal by a specific antenna element. Each of the amplifiers 412, 416 may be controlled independently (e.g., by the modem 402 or the controller/processor 434) to provide independent control of the gain for each antenna element 420. For example, the modem 402 and/or the controller/processor 434 may have at least one control line connected to each of the splitter 410, first amplifiers 412, phase shifters 414, and/or second amplifiers 416 that may be used to configure a gain to provide a desired amount of gain for each component and thus each antenna element 420.

The phase shifter 414 may provide a configurable phase shift or phase offset to a corresponding RF signal to be transmitted. The phase shifter 414 may be a passive phase shifter not directly connected to a power supply. Passive phase shifters might introduce some insertion loss. The second amplifier 416 may boost the signal to compensate for the insertion loss. The phase shifter 414 may be an active phase shifter connected to a power supply such that the active phase shifter provides some amount of gain or prevents insertion loss. The settings of each of the phase shifters 414 are independent, meaning that each can be independently set to provide a desired amount of phase shift or the same amount of phase shift or some other configuration. The modem 402 and/or the controller/processor 434 may have at least one control line connected to each of the phase shifters 414 and which may be used to configure the phase shifters 414 to provide a desired amount of phase shift or phase offset between antenna elements 420.

In the illustrated architecture 400, RF signals received by the antenna elements 420 are provided to one or more first amplifiers 456 to boost the signal strength. The first amplifiers 456 may be connected to the same antenna arrays 418 (e.g., for time division duplex (TDD) operations). The first amplifiers 456 may be connected to different antenna arrays 418. The boosted RF signal is input into one or more phase shifters 454 to provide a configurable phase shift or phase offset for the corresponding received RF signal to enable reception via one or more Rx beams. The phase shifter 454 may be an active phase shifter or a passive phase shifter. The settings of the phase shifters 454 are independent, meaning that each can be independently set to provide a desired amount of phase shift or the same amount of phase shift or some other configuration. The modem 402 and/or the controller/processor 434 may have at least one control line connected to each of the phase shifters 454 and which may be used to configure the phase shifters 454 to provide a desired amount of phase shift or phase offset between antenna elements 420 to enable reception via one or more Rx beams.

The outputs of the phase shifters 454 may be input to one or more second amplifiers 452 for signal amplification of the phase shifted received RF signals. The second amplifiers 452 may be individually configured to provide a configured amount of gain. The second amplifiers 452 may be individually configured to provide an amount of gain to ensure that the signals input to combiner 450 have the same magnitude. The amplifiers 452 and/or 456 are illustrated in dashed lines because they might not be necessary in some aspects. In some aspects, both the amplifier 452 and the amplifier 456 are present. In another aspect, neither the amplifier 452 nor the amplifier 456 are present. In other aspects, one of the amplifiers 452, 456 is present but not the other.

In the illustrated architecture 400, signals output by the phase shifters 454 (via the amplifiers 452 when present) are combined in combiner 450. The combiner 450 in architecture 400 combines the RF signal into a signal. The combiner 450 may be a passive combiner (e.g., not connected to a power source), which may result in some insertion loss. The combiner 450 may be an active combiner (e.g., connected to a power source), which may result in some signal gain. When combiner 450 is an active combiner, it may provide a different (e.g., configurable) amount of gain for each input signal so that the input signals have the same magnitude when they are combined. When combiner 450 is an active combiner, the combiner 450 may not need the second amplifier 452 because the active combiner may provide the signal amplification.

The output of the combiner 450 is input into mixers 448 and 446. Mixers 448 and 446 generally down convert the received RF signal using inputs from local oscillators 472 and 470, respectively, to create intermediate or baseband signals that carry the encoded and modulated information. The output of the mixers 448 and 446 are input into an analog-to-digital converter (ADC) 444 for conversion to digital signals. The digital signals output from ADC 444 are input to modem 402 for baseband processing, such as decoding, de-interleaving, or similar operations.

The architecture 400 is given by way of example only to illustrate an architecture for transmitting and/or receiving signals. In some cases, the architecture 400 and/or each portion of the architecture 400 may be repeated multiple times within an architecture to accommodate or provide an arbitrary number of RF chains, antenna elements, and/or antenna panels. Furthermore, numerous alternate architectures are possible and contemplated. For example, although only a single antenna array 418 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 422, 424, 426, 428) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 410, amplifiers 412, 416, or phase shifters 414 may be located between the DAC 404 and the first mixer 406 or between the first mixer 406 and the second mixer 408. In one example, the functions of one or more of the components may be combined into one component. For example, the phase shifters 414 may perform amplification to include or replace the first and/or or second amplifiers 412, 416. By way of another example, a phase shift may be implemented by the second mixer 408 to obviate the need for a separate phase shifter 414. This technique is sometimes called local oscillator (LO) phase shifting. In some aspects of this configuration, there may be multiple IF to RF mixers (e.g., for each antenna element chain) within the second mixer 408, and the local oscillator B 432 may supply different local oscillator signals (with different phase offsets) to each IF to RF mixer.

The modem 402 and/or the controller/processor 434 may control one or more of the other components 404 through 472 to select one or more antenna elements 420 and/or to form beams for transmission of one or more signals. For example, the antenna elements 420 may be individually selected or deselected for transmission of a signal (or signals) by controlling an amplitude of one or more corresponding amplifiers, such as the first amplifiers 412 and/or the second amplifiers 416. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 420, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 418) can be dynamically controlled by modifying the phase shifts or phase offsets imparted by the phase shifters 414 and amplitudes imparted by the amplifiers 412, 416 of the multiple signals relative to each other. The controller/processor 434 may be located partially or fully within one or more other components of the architecture 400. For example, the controller/processor 434 may be located within the modem 402 in some aspects.

As indicated above, FIG. 4 is provided as an example. Other examples may differ from what is described with regard to FIG. 4.

Figure 5:
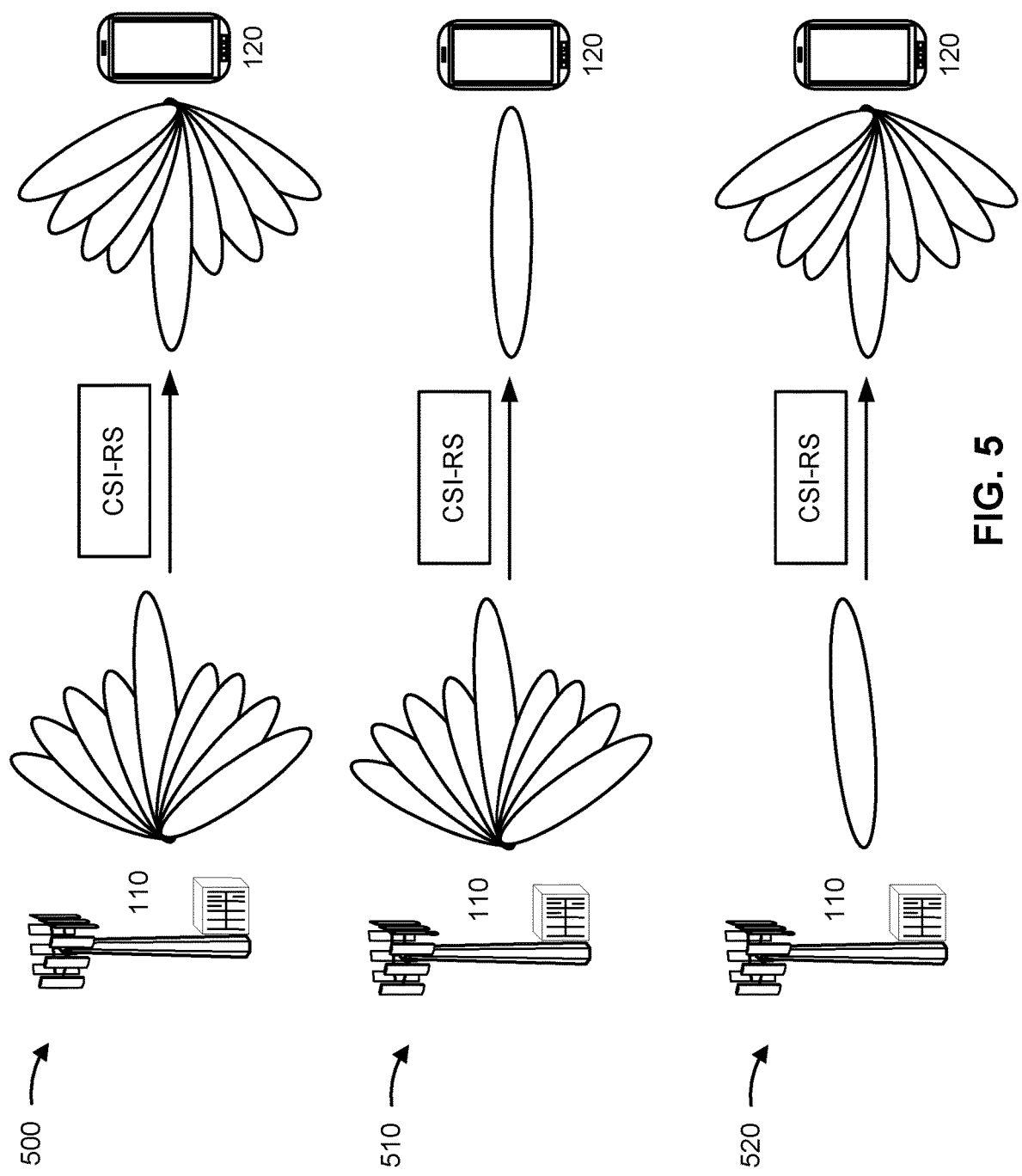
FIG. 5 is a diagram illustrating examples of beam management procedures, in accordance with the present disclosure.

FIG. 5 is a diagram illustrating examples 500, 510, and 520 of beam management procedures, in accordance with the present disclosure. As shown in FIG. 5, examples 500, 510, and 520 include a UE 120 in communication with a base station 110 in a wireless network (e.g., wireless network 100). However, the devices shown in FIG. 5 are provided as examples, and the wireless network may support communication and beam management between other devices (e.g., between a UE 120 and a base station 110 or TRP, between a UE 120 and a network entity, between a first network entity and a second network entity, between a mobile termination node and a control node, between an IAB child node and an IAB parent node, and/or between a scheduled node and a scheduling node). In some aspects, the UE 120 and the base station 110 may be in a connected state (e.g., an RRC connected state).

As shown in FIG. 5, example 500 may include a base station 110 and a UE 120 communicating to perform beam management using channel state information (CSI) reference signals (RS) (CSI-RSs). Example 500 depicts a first beam management procedure (e.g., P1 CSI-RS beam management). The first beam management procedure may be referred to as a beam selection procedure, an initial beam acquisition procedure, a beam sweeping procedure, a cell search procedure, and/or a beam search procedure. As shown in FIG. 5 and example 500, CSI-RSs may be configured to be transmitted from the base station 110 to the UE 120. The CSI-RSs may be configured to be periodic (e.g., using RRC signaling), semi-persistent (e.g., using MAC control element (MAC-CE) signaling), and/or aperiodic (e.g., using downlink control information (DCI)).

The first beam management procedure may include the base station 110 performing beam sweeping over multiple transmit (Tx) beams. The base station 110 may transmit a CSI-RS using each transmit beam for beam management. To enable the UE 120 to perform receive (Rx) beam sweeping, the base station may use a transmit beam to transmit (e.g., with repetitions) each CSI-RS at multiple times within the same RS resource set so that the UE 120 can sweep through receive beams in multiple transmission instances. For example, if the base station 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the base station 110, the UE 120 may perform beam sweeping through the receive beams of the UE 120. As a result, the first beam management procedure may enable the UE 120 to measure a CSI-RS on different transmit beams using different receive beams to support selection of base station 110 transmit beams/UE 120 receive beam(s) beam pair(s). The UE 120 may report the measurements to the base station 110 to enable the base station 110 to select one or more beam pair(s) for communication between the base station 110 and the UE 120. While example 500 has been described in connection with CSI-RSs, the first beam management process may also use synchronization signal blocks (SSBs) for beam management in a similar manner as described above.

As shown in FIG. 5, example 510 may include a base station 110 and a UE 120 communicating to perform beam management using CSI-RSs. Example 510 depicts a second beam management procedure (e.g., P2 CSI-RS beam management). The second beam management procedure may be referred to as a beam refinement procedure, a base station beam refinement procedure, a TRP beam refinement procedure, and/or a transmit beam refinement procedure. As shown in FIG. 5 and example 510, CSI-RSs may be configured to be transmitted from the base station 110 to the UE 120. The CSI-RSs may be configured to be aperiodic (e.g., using DCI). The second beam management procedure may include the base station 110 performing beam sweeping over one or more transmit beams. The one or more transmit beams may be a subset of all transmit beams associated with the base station 110 (e.g., determined based at least in part on measurements reported by the UE 120 in connection with the first beam management procedure). The base station 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the base station 110 to select a best transmit beam based at least in part on measurements of the CSI-RSs (e.g., measured by the UE 120 using the single receive beam) reported by the UE 120.

As shown in FIG. 5, example 520 depicts a third beam management procedure (e.g., P3 CSI-RS beam management). The third beam management procedure may be referred to as a beam refinement procedure, a UE beam refinement procedure, and/or a receive beam refinement procedure. As shown in FIG. 5 and example 520, one or more CSI-RSs may be configured to be transmitted from the base station 110 to the UE 120. The CSI-RSs may be configured to be aperiodic (e.g., using DCI). The third beam management process may include the base station 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the base station may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the base station 110 and/or the UE 120 to select a best receive beam based at least in part on reported measurements received from the UE 120 (e.g., of the CSI-RS of the transmit beam using the one or more receive beams).

As indicated above, FIG. 5 is provided as an example of beam management procedures. Other examples of beam management procedures may differ from what is described with respect to FIG. 5. For example, the UE 120 and the base station 110 may perform the third beam management procedure before performing the second beam management procedure, and/or the UE 120 and the base station 110 may perform a similar beam management procedure to select a UE transmit beam.

Figure 6:
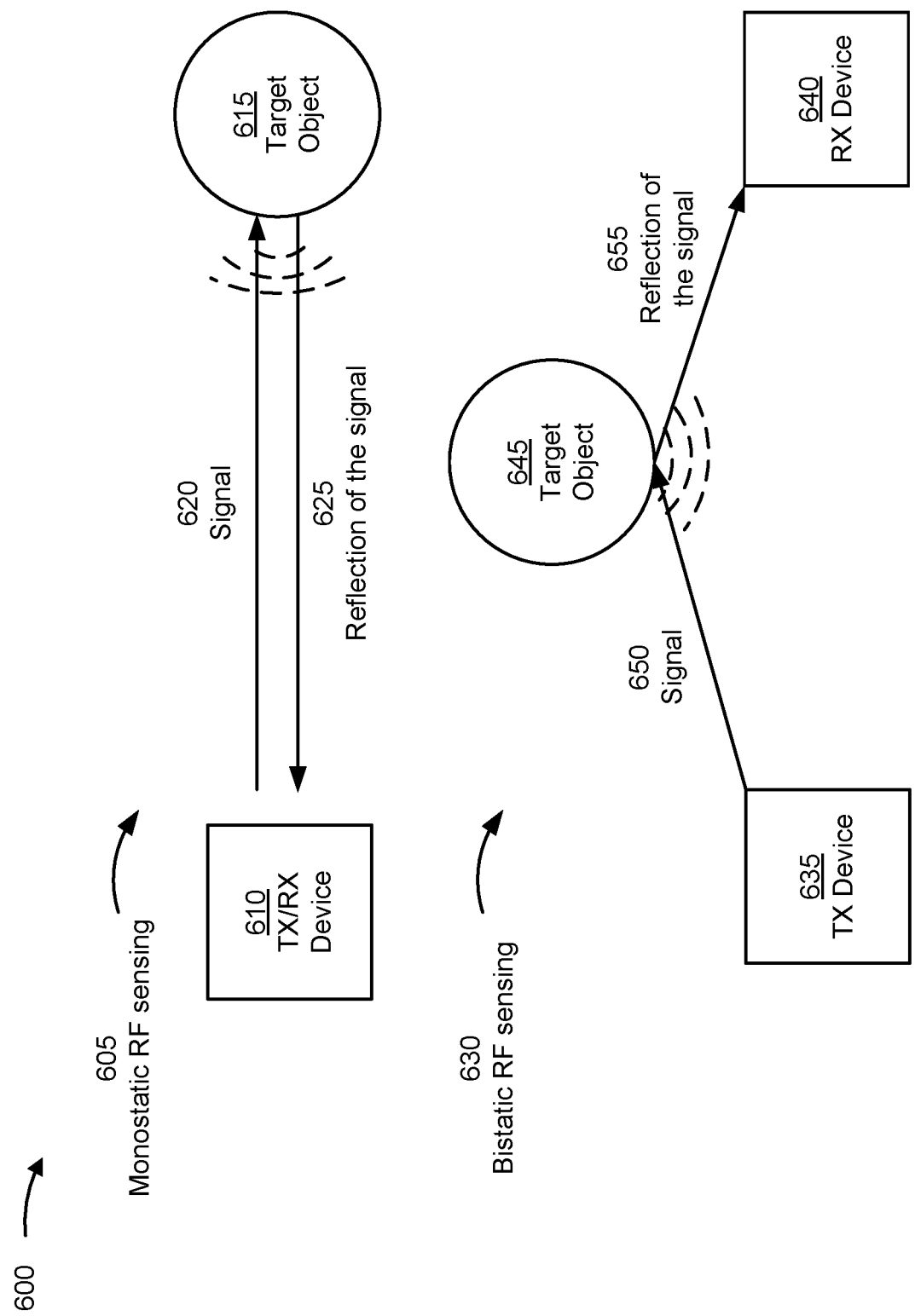
FIG. 6 is a diagram illustrating an example of radio frequency (RF) sensing, in accordance with the present disclosure.

FIG. 6 is a diagram illustrating an example 600 of RF sensing, in accordance with the present disclosure. Wireless communication signals (e.g., RF signals configured to carry OFDM symbols) transmitted between a UE and a network entity can be reused for RF sensing (e.g., environment sensing). Using wireless communication signals for RF sensing can be regarded as consumer-level radar with advanced detection capabilities that enable, among other things, touchless/device-free interaction with a device/system. "RF sensing" may be a radar operation performed by a wireless communication device, such as a UE, a network entity, or another device (such as a WLAN access point), using wireless communication signals.

RF sensing may also be referred to as environment sensing, radar sensing, WLAN sensing, Wi-Fi sensing, and/or wireless sensing, among other examples. The wireless communication signals used to perform RF sensing may be cellular communication signals (e.g., LTE signals or NR signals) or WLAN signals (e.g., Wi-Fi signals), among other examples. As a particular example, the wireless communication signals may be an OFDM waveform as utilized in LTE and NR. High-frequency communication signals, such as millimeter wave signals, may be beneficial to use as RF sensing signals because the higher frequency provides a more accurate range (e.g., distance) detection and/or motion detection. As another example, WLAN signals (e.g., WLAN or Wi-Fi signals that would otherwise be used for wireless communication) may be used to perform RF sensing (for example, to conserve power relative to using a higher frequency range signal). In such examples, the RF sensing may be referred to as WLAN sensing or Wi-Fi sensing.

RF sensing may be performed using various frequency bands or frequency ranges, such as the millimeter wave band or the sub-6 GHz band, among other examples. In some examples, different frequencies may be used sequentially (e.g., first using a sub-6 GHz frequency and second using a millimeter wave frequency) by a wireless communication device performing the RF sensing to vary a resolution (e.g., from coarse to fine), vary a detection range (e.g., from large to narrow), and/or vary power consumption (e.g., from low to high), among other examples.

As shown in FIG. 6, a wireless communication device may detect and/or monitor a target object by transmitting and/or measuring wireless communication signals. Possible use cases of RF sensing include health monitoring (such as heartbeat detection, and/or respiration rate monitoring, among other examples), gesture recognition (such as human activity recognition, keystroke detection, and/or sign language recognition, among other examples), contextual information acquisition (such as location detection/tracking, direction finding, and/or range estimation, among other examples), and/or automotive radar (such as smart cruise control and/or collision avoidance), among other examples.

Similar to conventional radar (e.g., frequency modulation continuous waveform (FMCW) radar), an OFDM-based radar signal can be used to estimate the range (e.g., distance), velocity (e.g., Doppler spread), and/or angle (e.g., angle of arrival (AoA)) of a target object. In FMCW techniques, an RF signal with a known stable frequency continuous wave (i.e., an RF signal with constant amplitude and frequency) varies up and down in frequency over a fixed period of time according to a modulating signal. Unlike conventional radar, RF sensing may use a PHY layer for both RF sensing measurements and wireless communication. Sensing signals may be transmitted in a beam (e.g., using beamforming) and may reflect off nearby objects within the beam. A portion of the transmitted RF signals is reflected back toward a radar sensor, which receives/detects the RF return data (e.g., the reflections of the transmitted signals).

FMCW radar signals are typically formed as a simple chirp waveform. A chirp waveform can be used when the only purpose of the transmitted RF signal is for RF sensing. However, due to the short wavelength, a more complex OFDM waveform can be used for both wireless communication (e.g., over a wireless network) and RF sensing. To use an OFDM waveform as a signal for RF sensing, specific reference signals, which may be referred to herein as radar reference signals (RRS), may be needed. The RF sensing performance (e.g., resolution and maximum values of range, velocity, and/or angle) may depend on the RRS design. For example, for a gesture recognition use case, coarse range/velocity estimation may be sufficient for the RF sensing. That is, it may be sufficient for a wireless communication device to be able to detect a pattern of movement relative to the current position of the target object (e.g., a user's hand or head). In this case, a low density (e.g., sparse) RRS with a short wavelength and narrow bandwidth may be sufficient to provide the necessary range and velocity resolution. For a vibration detection use case, such as for respiration monitoring, accurate Doppler estimation may be important, whereas accurate range estimation may not be as important. In this case, a high-density RRS with a long duration in the time domain may be beneficial. For a location detection use case, such as for object detection, accurate range estimation may be important, whereas accurate Doppler estimation may not be as important. In this case, a high-density wideband RRS in the frequency domain may be beneficial. Therefore, a network entity May configure one or more RRSs depending on a use case of the RF sensing to improve the RF sensing performance. In some cases, an RRS may be a sounding reference signal (SRS) or a WLAN signal, among other examples.

As shown by reference number 605, a wireless communication device may perform monostatic RF sensing (e.g., monostatic radar sensing) using an air interface (e.g., an NR-air interface or a WLAN interface) and wireless signals, such as an RRS. For example, as shown by reference number 605, a Tx/Rx device 610 may perform target object detection to detect a target object 615. As shown by reference number 620, the Tx/Rx device 610 may transmit a signal (e.g., an RRS and/or an SRS) associated with an RF sensing operation. The signal may reflect or deflect off of the target object 615, such that at least a portion of the signal reflects back toward the Tx/Rx device 610. For example, as shown by reference number 625, a reflection of the signal (e.g., that was transmitted by the Tx/Rx device 610) may be received by the Tx/Rx device 610. The Tx/Rx device 610 may measure the reflection of the signal to determine a range (e.g., distance), a velocity (e.g., Doppler spread), and/or an angle (e.g., an AoA) of the target object 615. As a result, the Tx/Rx device 610 may be enabled to perform target object detection using the monostatic RF sensing (e.g., monostatic radar sensing) technique.

As shown by reference number 630, a Tx device 635 and an Rx device 640 may coordinate with one another to perform bistatic RF sensing (e.g., bistatic radar sensing) using an air interface (e.g., an NR-air interface or a WLAN interface) and wireless signals, such as an RRS. Bistatic RF sensing may also be referred to as multi-static RF sensing. For example, as shown by reference number 650, the Tx device 635 may transmit a signal (e.g., an RRS and/or an SRS) associated with a RF sensing operation. The signal may reflect or deflect off of a target object 645, such that at least a portion of the signal reflects back toward the Rx device 640. For example, as shown by reference number 655, a reflection of the signal (e.g., that was transmitted by the Tx device 635) may be received by the Rx device 640. The Rx device 640 may measure the reflection of the signal to determine a range (e.g., distance), a velocity (e.g., Doppler spread), and/or an angle (e.g., an AoA) of the target object 645. As a result, the Tx device 635 and the Rx device 640 may be enabled to perform target object detection using the bistatic RF sensing (e.g., bistatic radar sensing) technique.

As indicated above, FIG. 6 is provided as an example. Other examples may differ from what is described with respect to FIG. 6.

In some cases, a UE may communicate with a network entity using one or more communication parameters, such as a beam (or beam pair), a frequency band, a transmit power, an MCS, a time domain resource allocation, a frequency domain resource allocation, and/or one or more resource blocks, among other examples. The one or more communication parameters may be selected by the UE and/or the network entity based at least in part on existing wireless communication metrics (e.g., beam measurements, signal strength measurements, and/or signal quality measurements, among other examples). For example, the UE and the network entity may perform beam search, beam management, and/or beam selection procedures to identify a beam and/or a beam pair to be used for communications between the UE and the network entity (e.g., in a similar manner as described in connection with FIG. 5). However, the UE deployed in a wireless network may be mobile (e.g., may move over time). As a result, as the UE moves relative to the network entity, wireless communication metrics (e.g., beam measurements, signal strength measurements, and/or signal quality measurements, among other examples) associated with a connection between the UE and the network entity may change. Therefore, different communication parameters, or a different value for a communication parameter, may need to be used for communications between the UE and the network entity due to the changing wireless communication metrics. However, the UE and/or the network entity may not receive an indication of the changing wireless communication metrics until measurements are performed by the UE and/or the network entity or until a connection between the UE and the network entity is lost. As a result, the UE and the network entity may communicate using suboptimal communication parameters (e.g., that may result in poor signal strength and/or poor signal quality) and/or a connection between the UE and the network entity may be lost due to the movement of the UE relative to the network entity.

Some techniques and apparatuses described herein enable RF sensing assisted wireless communication. For example, a UE may obtain (for example, receive or obtain via performing RF sensing) RF sensing information indicating movement information associated with the UE and/or environment information associated with the UE, among other examples. The UE may communicate, with a network entity, using a communication parameter that is based at least in part on the RF sensing information. As a result, the UE and/or the network entity may be enabled to adjust and/or modify a communication parameter (e.g., a beam, a transmit power, an MCS, a time domain resource allocation, and/or a frequency domain resource allocation, among other examples) used for communications between the UE and the network entity based at least in part on the RF sensing information (e.g., the movement information associated with the UE and/or the environment information associated with the UE). As a result, the communication parameter may be selected based at least in part on the movement and/or orientation of the UE, thereby enabling the communication parameter to be selected to improve wireless communication metrics (e.g., signal strength and/or signal quality) of a connection between the UE and the network entity (e.g., before the wireless communication metrics degrade based at least in part on using a suboptimal communication parameter). This may improve a performance of the UE and/or wireless communication metrics of a connection between the UE and the network entity.

Figure 7:
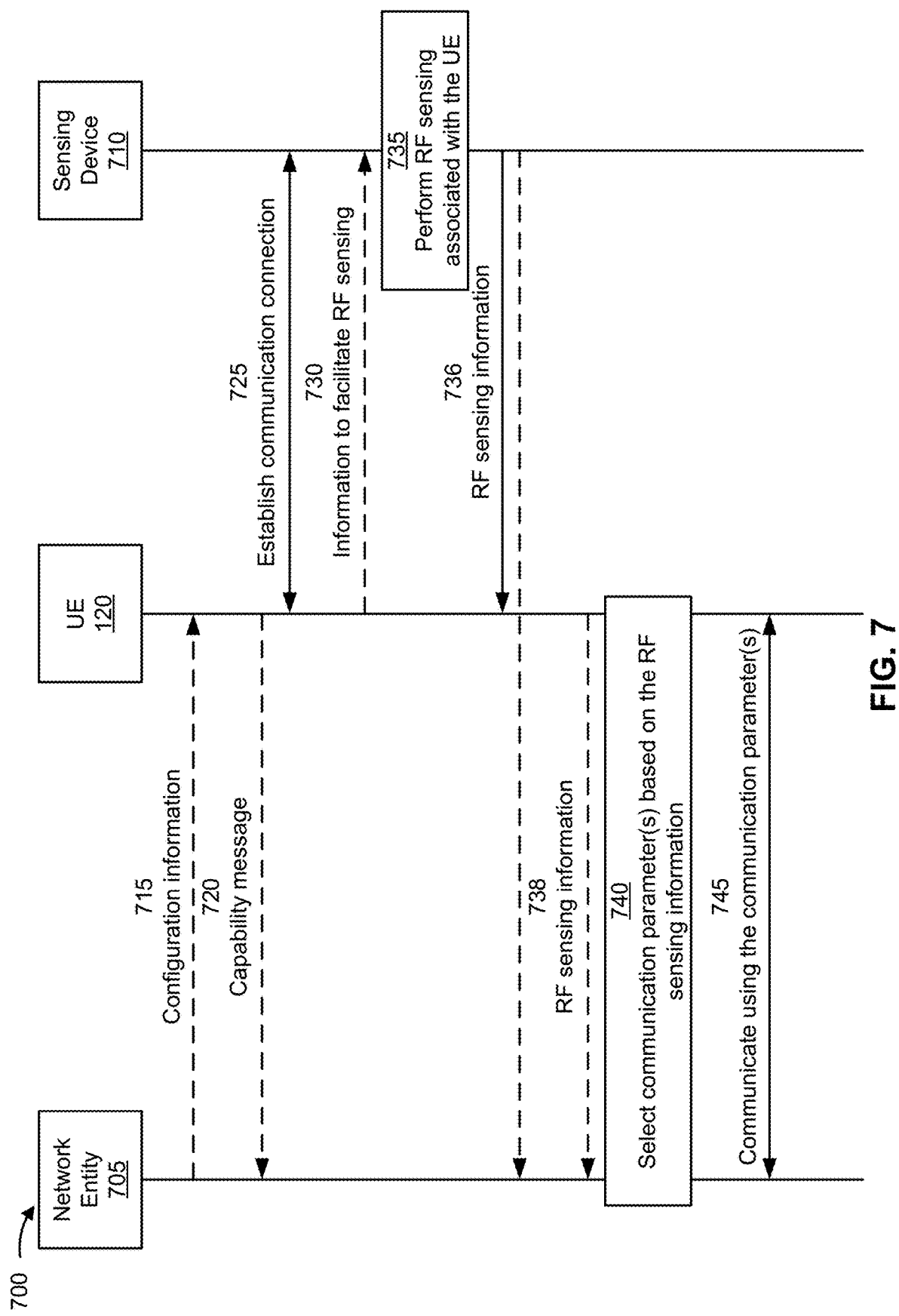
FIG. 7 is a diagram of an example associated with RF sensing assisted wireless communication, in accordance with the present disclosure.

FIG. 7 is a diagram of an example 700 associated with RF sensing assisted wireless communication, in accordance with the present disclosure. As shown in FIG. 7, a network entity 705 (e.g., a base station 110, a CU, a DU, an RU, and/or an IAB node, among other examples) may communicate with a UE (e.g., the UE 120). In some aspects, the network entity 705 and the UE 120 may be part of a wireless network (e.g., the wireless network 100). The UE 120 and the base station 110 may have established a wireless connection prior to operations shown in FIG. 7. In some aspects, the UE 120 and the base station 110 may communicate using beamformed communications (e.g., in a similar manner as described above, such as in connection with FIGS. 4 and 5).

The UE 120 and/or the network entity 705 may also communicate with a sensing device 710. The sensing device 710 may be a device capable of performing RF sensing, as described in more detail elsewhere herein. For example, the sensing device 710 may be a network entity, a UE, an access point (e.g., a WLAN access point or a Wi-Fi access point), or another device capable of performing RF sensing. An access point may be a device that generates and/or manages a WLAN in a given area. For example, an access point may communicate with a router device and may provide wireless access to a network associated with the router for one or more devices in the given area (e.g., associated with the WLAN). In some aspects, the sensing device 710 may be capable of communicating with the UE 120 and/or the network entity 705 (e.g., via a wireless communication connection and/or a wired communication connection). In some aspects, the UE 120 may perform one or more (or all) operations described herein as being performed by the sensing device 710. In such examples, the example 700 may not include the sensing device 710.

As shown by reference number 715, the network entity 705 may transmit, and the UE 120 may receive, configuration information. In some aspects, the UE 120 may receive the configuration information via one or more of RRC signaling, one or more MAC-CEs, and/or DCI, among other examples. In some aspects, the configuration information may include an indication of one or more configuration parameters (e.g., already known to the UE 120 and/or previously indicated by the network entity 705 or other network device) for selection by the UE 120, and/or explicit configuration information for the UE to use to configure the UE 120, among other examples.

In some aspects, the configuration information may indicate that the UE 120 is to communicate with the network entity 705 using one or more communication parameters that are based at least in part on RF sensing information associated with the UE 120, as described in more detail elsewhere herein. For example, the configuration information may indicate that the UE 120 is to obtain RF sensing information (e.g., based at least in part on performing RF sensing or receiving the RF sensing information from the sensing device 710) associated with the UE 120 (e.g., where the RF sensing information indicates movement information associated with the UE 120 and/or environment information associated with the UE 120, among other examples). The configuration information may indicate that the UE 120 is to communicate, with the network entity 705, using a communication parameter that is based at least in part on the RF sensing information. In other words, the UE 120 may be configured, by the network entity 705, to communicate with the network entity 705 using one or more communication parameters that are based at least in part on RF sensing information.

The UE 120 may configure itself based at least in part on the configuration information. In some aspects, the UE 120 may be configured to perform one or more operations described herein based at least in part on the configuration information.

As shown by reference number 720, the UE may transmit, and the network entity 705 may receive, a capability message. The capability message may include a report (e.g., a list or a set) of one or more capabilities supported by the UE 120. In some aspects, the capability message may indicate UE support for RF sensing assisted wireless communication. For example, the UE 120 may transmit, and the network entity 705 may receive, an indication that the UE 120 supports selecting and/or communicating using communication parameters that are based at least in part on RF sensing information. For example, the UE 120 may transmit, and the network entity 705 may receive, an indication that the UE 120 is capable of performing RF sensing. As another example, the UE 120 may transmit, and the network entity 705 may receive, an indication that the UE 120 has access to RF sensing information associated with the UE 120 (e.g., based at least in part on establishing a communication connection with the sensing device 710, as explained in more detail elsewhere herein). The capability message may be included in uplink control information, a UE capability indication, an uplink message, and/or a physical uplink control channel (PUCCH) message, among other examples.

As shown by reference number 725, the UE 120 and the sensing device 710 may communicate with one another to establish a communication connection. For example, the UE 120 and the sensing device 710 may perform one or more protocols for establishing the communication connection. In some aspects, the communication connection between the UE 120 and the sensing device 710 may be a wireless connection. In some other aspects, the communication connection between the UE 120 and the sensing device 710 may be a wired connection. The communication connection between the UE 120 and the sensing device 710 may be associated with a RAT. In some aspects, the RAT may be a WLAN RAT (e.g., a Wi-Fi RAT), a 5G RAT, or an LTE RAT, among other examples. In some aspects, the RAT associated with the communication connection between the UE 120 and the sensing device 710 and the RAT associated with the communication connection between the UE 120 and the network entity 705 may be different. In some other aspects, the RAT associated with the communication connection between the UE 120 and the sensing device 710 and the RAT associated with the communication connection between the UE 120 and the network entity 705 may be the same. The communication connection between the UE 120 and the sensing device 710 may be associated with communicating data and/or enabling the UE 120 to access a data network (e.g., to provide an internet connection for the UE 120).

In some aspects, the UE 120 performing the RF sensing assisted wireless communication described herein may be based at least in part on the UE 120 establishing a communication connection with both the network entity 705 and the sensing device 710. For example, in some cases the UE 120 may be operating in an environment in which communication connections are available via both a wireless communication network (e.g., a 5G network, a 4G network, or another network) and a WLAN, such as an indoor environment. In such examples, the UE 120 may be enabled to communicate via the wireless communication network (e.g., with the network entity 705) and via the WLAN (e.g., with the sensing device 710). Therefore, the UE 120 may be enabled to perform the RF sensing assisted wireless communication as described herein.

In some aspects, as shown by reference number 730, the UE 120 may transmit, and the sensing device 710 may receive, information to facilitate RF sensing associated with the UE 120. The information may include an identifier associated with the UE 120, an identifier associated with the network entity 705, a cell identifier (e.g., a physical cell identifier (PCI)) of a cell associated with the network entity 705, and/or a physical location of the network entity 705, one or more capabilities of the UE 120 (e.g., a quantity of beams that can be supported or formed by the UE 120, one or more beams or one or more transmission configuration indicator (TCI) states configured for (or activated for) the UE 120 (e.g., by the network entity 705), a quantity of antenna panels associated with the UE 120, one or more MCSs supported by the UE 120, and/or a transmit power capability of the UE 120, among other examples), among other examples. For example, the UE 120 may transmit an indication of the location of the network entity 705 to enable the sensing device 710 to predict beam blockages associated with the communication connection between the UE 120 and the network entity 705 using RF sensing associated with the UE 120, as described in more detail elsewhere herein. The UE 120 may transmit, and the sensing device 710 may receive, the information to facilitate RF sensing associated with the UE 120 via a control channel (e.g., a WLAN control channel) associated with the communication connection between the UE 120 and the sensing device 710.

As shown by reference number 735, the sensing device 710 may perform RF sensing associated with the UE 120. For example, the sensing device 710 may perform RF sensing to obtain RF sensing information associated with an environment of the UE 120, a movement of the UE 120, and/or an orientation of the UE 120, among other examples. For example, the sensing device 710 may transmit one or more sensing signals and may obtain the RF sensing information associated with the UE 120 based at least in part on measuring the one or more sensing signals (e.g., in a similar manner as described in connection with FIG. 6). In some aspects, the RF sensing information may indicate movement information associated with the UE 120 (e.g., a movement and/or a rotation of the UE 120) and/or environment information (e.g., an environment map) associated with the UE 120. The RF sensing performed by the sensing device 710 may be monostatic RF sensing or bistatic RF sensing. For example, in some cases, the sensing device 710 may communicate with another device (e.g., the UE 120 or another sensing device) to perform the RF sensing, such as when a bistatic RF sensing technique is used by the sensing device 710. In some aspects, the RF sensing information may be Wi-Fi sensing information or WLAN sensing information (e.g., information obtained via performing Wi-Fi sensing or WLAN sensing).

In some aspects, the sensing device 710 may track a location and/or orientation of the UE 120. For example, the sensing device 710 may periodically (e.g., every m seconds) perform RF sensing to determine the location and/or orientation of the UE 120. In some aspects, the sensing device 710 and the UE 120 may communicate to synchronize a geographic coordinate system to be used to indicate the location and/or orientation of the UE 120. For example, the sensing device 710 may transmit, and the UE 120 may receive, an indication of the geographic coordinate system to be used by the sensing device 710 to track the location and/or the orientation of the UE 120. In some aspects, the sensing device 710 may transmit, and the UE 120 may receive, an indication of one or more reference points associated with the geographic coordinate system (e.g., to be used to indicate the location and/or the orientation of the UE 120 relative to the one or more reference points). In some other aspects, the sensing device 710 may transmit, and the UE 120 may receive, an indication that the location and/or the orientation of the UE 120 are to be indicated relative to a previous location and/or a previous orientation of the UE 120. For example, the RF sensing information may indicate that the UE 120 has rotated 20 degrees clockwise relative to a previous orientation of the UE 120. The synchronization of the geographic coordinate system to be used by the sensing device 710 may enable the UE 120 to correctly interpret the RF sensing information provided by the sensing device 710.

In some aspects, the sensing device 710 may use RF sensing to construct a three-dimensional map of the environment of the UE 120. The three-dimensional map may indicate objects located proximate to the UE 120, such as a human, a wall, a couch, a table, a television, a vehicle, a tree, and/or a building, among other examples, as well as a location of the UE 120 within the three-dimensional map. In some aspects, the sensing device 710 may perform RF sensing to construct the three-dimensional map of the environment of the UE 120 after the UE 120 and the sensing device establish the communication connection. For example, the sensing device 710 may perform the RF sensing to construct the three-dimensional map of the environment of the UE 120 once (e.g., a single time after the UE 120 and the sensing device 710 establish the communication connection). Alternatively, the sensing device 710 may perform the RF sensing to construct the three-dimensional map of the environment of the UE 120 periodically (e.g., every k seconds) to update the three-dimensional map as objects proximate to the UE 120 may move over time.

The sensing device 710 may use RF sensing to construct the three-dimensional map of the environment of the UE 120 by transmitting sensing signals over a wide angular range (e.g., 180 degrees or greater). The sensing device 710 may measure the sensing signals to detect one or more objects in the environment associated with the UE 120. The sensing device 710 may store a location of the detected objects (e.g., to construct the three-dimensional map of the environment of the UE 120).

Additionally, the sensing device 710 may perform RF sensing to track objects in the environment and to track the location of the UE 120 and/or the orientation of the UE 120. For example, the sensing device 710 may periodically (e.g., every t milliseconds, where t is 1, 2, 5, or another value) perform RF sensing to track objects in the environment and to track the location of the UE 120 and/or the orientation of the UE 120.

In some aspects, the RF sensing information may include beam blockage information. For example, as described above the network entity 705 and the UE 120 may communicate with one another via one or more beams, which may include an uplink beam, a downlink beam, and/or a beam pair. In some cases, the beam may become blocked, such as when an obstruction interrupts a propagation path of the beam. Beam blocking may result in an abrupt decrease (e.g., below a threshold, such as a noise floor) in the useful signal strength received for the beam and/or one or more adjacent beams in a beam set that includes the beam. This degradation in signal strength may occur across the entire system bandwidth on those beams (e.g., rather than being isolated to one or more frequencies) for a duration of time. This may result in communication errors, such as dropped communications, failed reception, failed demodulation, and/or failed decoding. However, the received signal strength on other beams that are not blocked may be unaffected or may be above a threshold (e.g., the noise floor) such that beam switching to one of these beams provides a viable link between the UE 120 and the network entity 705.

When beam blocking occurs, the network entity 705 may modify or reconfigure communications with the UE 120, such as by performing a beam switching or beam management procedure to switch to a different beam and/or by retransmitting a communication on the blocked beam (e.g., once a blocking event has ended, such as when an obstruction moves out of the propagation path of the beam). However, the network entity 705 may be unable to take such corrective actions until the beam blockage occurs. The sensing device 710 may use RF sensing to predict a beam blockage to enable the UE 120 and/or the network entity to perform corrective action(s) earlier in time, thereby improving a link quality between the UE 120 and the network entity 705 because the corrective action may be taken prior to the beam blockage actually occurring.

For example, the beam blockage information may be based at least in part on the environment map (e.g., the three-dimensional map of the environment of the UE 120), a current location and/or orientation of the UE 120 (e.g., based on the most recent RF sensing performed by the sensing device 710), and/or the location of the network entity 705. For example, the sensing device 710 may identify a beam blockage based at least in part on the one or more objects in the environment, the location of the UE 120, the orientation of the UE 120, and/or the environment map associated with the environment of the UE 120, among other examples. For example, the sensing device 710 may identify a propagation path of the link between the UE 120 and the network entity 705. The propagation path may be a line of sight (LOS) path (e.g., where a signal is transmitted directly between the UE 120 and the network entity 705) or a non-LOS (NLOS) path (e.g., where the propagation path is obscured or redirected by one or more objects).

In LOS scenarios, the sensing device 710 may identify the beam blockage based at least in part on using geometry associated with a directionality of transmissions between the UE 120 and the network entity 705. For example, using the location of the UE 120, the location of the network entity 705, and the location(s) of one or more objects located proximate to the UE 120, the sensing device 710 may be enabled to predict if/when the one or more objects located proximate to the UE 120 will block the propagation path between the UE 120 and the network entity 705 (e.g., resulting in a beam blockage). In NLOS scenarios, the sensing device 710 may use additional techniques or considerations (e.g., in addition to the information used to predict beam blockages in LOS scenarios), such as utilizing a machine learning model to predict the beam blockages.

In some aspects, the beam blockage information may indicate a predicted blockage associated with a body part of a user of the UE 120, such as a hand of the user. For example, in some cases, the user may position the body part in front of an antenna or antenna panel of the UE 120. In some cases, this may result in a beam blockage. Additionally, or alternatively, the body part blockage may result in the UE 120 being unable to use the antenna or the antenna panel due to maximum permissible exposure (MPE) limits. For example, some governing bodies have placed restrictions on a peak radiated power that can be directed toward a human body. These restrictions are sometimes referred to as MPE limits, among other examples. Therefore, if a body part of the user is placed in front of, or near, an antenna or antenna panel of the UE 120, then the UE 120 may be unable to use the antenna or the antenna panel for uplink transmissions. The sensing device 710 may perform RF sensing to track positions of various body parts of the user. The sensing device 710 may detect, based at least in part on performing the RF sensing, when a body part of the user is blocking (e.g., is placed in front of or proximate to) an antenna or antenna panel of the UE 120. The RF sensing information may include an indication that the antenna or the antenna panel of the UE 120 is blocked by a body part of the user.

In some aspects, the beam blockage information may be associated with a static beam blockage (e.g., caused by a static object, such as a wall, a table, a couch, or a tree, among other examples) or a dynamic beam blockage (e.g., caused by a mobile object, such as a human, an animal, or a vehicle, among other examples). For example, the beam blockage information may indicate a predicted blockage associated with an object located proximate to the UE 120. In some aspects, the beam blockage information includes a beam blockage prediction (e.g., a predicted beam blockage that is to occur at a future time). In some aspects, the beam blockage information includes a timing of a predicted beam blockage. For example, the sensing device 710 may be enabled to detect that a beam blockage is to occur (e.g., based at least in part on detecting and/or tracking a movement of the UE 120 and other objects in the environment associated with the UE 120) and may be enabled to detect when the beam blockage will occur. For example, the RF sensing information may indicate that a beam blockage is predicted to occur in z milliseconds (e.g., where z is the amount of time until the beam blockage is predicted to occur).

In some aspects, the beam blockage information may indicate a predicted duration of the predicted beam blockage. For example, based at least in part on a movement of the UE 120 (e.g., a direction of movement and/or a speed of the UE 120) and/or a movement of an object (e.g., a direction of movement and/or a speed of the object), the sensing device 710 may determine the duration of the predicted beam blockage.

In some aspects, the UE 120 (e.g., rather than the sensing device 710) may identify the beam blockage in a similar manner as described herein. For example, the RF sensing information may include the location of the UE 120, the location of the network entity 705, and/or the location(s) of one or more objects located proximate to the UE 120, among other examples, and the UE 120 may use the RF sensing information to predict a beam blockage associated with the communication connection with the network entity 705.

As shown by reference number 736, the sensing device 710 may transmit, and the UE 120 and/or the network entity 705 may receive, the RF sensing information. The sensing device 710 may transmit the RF sensing information to facilitate communication management between the UE 120 and the network entity 705 (e.g., to facilitate the selection of one or more communication parameters, as described in more detail elsewhere herein). The sensing device 710 may transmit the RF sensing information via a control channel (e.g., a WLAN control channel or another control channel). For example, the sensing device 710 may use control signaling to indicate the RF sensing information to the UE 120 and/or the network entity 705 (e.g., the RF sensing information may be included in a control channel message). In some aspects, the sensing device 710 may periodically (e.g., according to a periodic schedule) transmit the RF sensing information (e.g., every t milliseconds or another amount of time). In some aspects, as shown by reference number 738, the UE 120 may transmit, and the network entity 705 may receive, the RF sensing information. For example, the UE 120 may forward the RF sensing information received from the sensing device 710 to the network entity 705. The UE 120 may transmit the indication of the RF sensing information via an uplink control information message (e.g., a PUCCH message) or via a physical uplink shared channel (PUSCH) message.

As described in more detail elsewhere herein, the RF sensing information may include information associated with movement information of the UE 120 (e.g., a direction of movement and/or speed of the UE 120), an orientation of the UE 120 (e.g., in a three-dimensional space), a location of one or more objects located proximate to the UE 120, and/or movement information of the one or more objects (e.g., a direction of movement and/or a speed of the one or more objects), among other examples. In some aspects, the RF sensing information may include beam blockage information, such as a predicted beam blockage and/or a timing of the predicted beam blockage, among other examples, as explained in more detail elsewhere herein.

As shown by reference number 740, the UE 120 and/or the network entity 705 may select one or more communication parameters for communications between the UE 120 and the network entity 705 based at least in part on the RF sensing information. In some aspects, the UE 120 may select the one or more communication parameters (e.g., and may, or may not, transmit an indication of the selected communication parameter(s) to the network entity 705). In some other aspects, the network entity 705 may select the one or more communication parameters (e.g., and may transmit an indication of the selected communication parameter(s) to the UE 120). In some aspects, the UE 120 and the network entity 705 may exchange one or more messages to select the one or more communication parameters.

The one or more communication parameters may include a beam (e.g., a transmit beam, a receive beam, and/or a beam pair), a time domain resource allocation, a frequency domain resource allocation, a transmit power level, one or more resource blocks, and/or an MCS, among other examples. The UE 120 and/or the network entity 705 may select one or more communication parameters to improve or optimize a signal strength and/or a signal quality of the communication connection between the UE 120 and the network entity 705. For example, the UE 120 and/or the network entity 705 may identify that, based at least in part on movement information of the UE 120, that a signal strength or signal quality of the communication connection between the UE 120 and the network entity 705 will decrease in the future (e.g., because the UE 120 is moving away from, and/or is rotating away from, the network entity 705). Therefore, the UE 120 and/or the network entity 705 may determine that communication(s) between the UE 120 and the network entity 705 may use an increased transmit power (e.g., to improve reliability and/or a received signal strength of the communication(s)), an increased frequency domain resource allocation and/or time domain resource allocation (e.g., to improve a reliability of the communication(s)), and/or a different MCS, among other examples. As another example, the UE 120 and/or the network entity 705 may identify that, based at least in part on movement information of the UE 120, that a signal strength or signal quality of the communication connection between the UE 120 and the network entity 705 will increase in the future (e.g., because the UE 120 is moving toward, and/or is rotating toward, the network entity 705). Therefore, the UE 120 and/or the network entity 705 may determine that communication(s) between the UE 120 and the network entity 705 may use a decreased transmit power (e.g., to conserve power), among other examples.

In some aspects, the UE 120 may perform one or more actions based at least in part on the RF sensing information (e.g., to improve a signal strength or a quality of communications between the UE 120 and the network entity 705). For example, the UE 120 may measure a candidate beam that is selected based at least in part on the RF sensing information and/or the selected communication parameter. For example, the UE 120 may perform a beam search procedure (e.g., in a similar manner as described in connection with FIG. 5). However, rather than using a random order or a round-robin order for measuring candidate beams, the UE 120 may prioritize measuring one or more candidate beams that are associated with spatial directions toward the network entity 705 (e.g., based at least in part on a location and/or orientation of the UE 120 as indicated by the RF sensing information). This may improve the beam search procedure by enabling the UE 120 to measure candidate beams that have a higher likelihood of being associated with good communication metrics (e.g., high RSRP or high RSRQ) earlier in time. Additionally, this may reduce a latency associated with the beam search procedure.

For example, the UE 120 and the network entity 705 may communicate (e.g., prior to the UE 120 obtaining the RF sensing information) using another beam. The UE 120 may measure a beam as part of a beam search procedure. The beam may be selected for the beam search procedure based at least in part on a rotation, an orientation, and/or a movement of the UE 120 and codebook information stored by the UE 120. For example, the codebook information may indicate spatial directions associated with one or more beams or TCI states associated with the UE 120. The UE 120 may use the codebook information to identify beams or TCI states associated with spatial directions toward the network entity 705 (e.g., based at least in part on the location of the network entity 705, the rotation of the UE 120, the orientation of the UE 120, and/or the movement of the UE 120, among other examples). The UE 120 and/or the network entity may select the beam and/or a beam pair including the beam for communications between the UE 120 and the network entity 705 based at least in part on the UE 120 performing the beam search procedure (e.g., that is optimized using the RF sensing information).

As another example, the UE 120 may an action to mitigate a beam blockage based at least in part on beam blockage information indicated by the RF sensing information. For example, the action may include removing one or more beam measurements from a beam measurement database and initiating a beam search procedure. For example, the UE 120 may reset the beam measurement database and may initiate a beam search procedure for the best beam based at least in part on receiving beam blockage information, as described in more detail elsewhere herein. Additionally, or alternatively, the action may include refraining from performing beam measurements of a first one or more beams or using a first one or more antenna panels, where the first one or more beams or the first one or more antenna panels are associated with the beam blockage as indicated by the beam blockage information. For example, a given antenna or antenna panel may be associated with a beam blockage and/or may be blocked by a body part of the user of the UE 120. Therefore, the UE 120 may restrict a beam search so as to not measure the first one or more beams and/or beams associated with the first one or more antenna panels. This may improve a likelihood that these beams are not selected for communications between the UE 120 and the network entity 705. As another example, the UE 120 may restrict a beam search only to the widest beams (e.g., beams associated with a largest angular spread) in a codebook stored by the UE 120. Additionally, or alternatively, the action may include prioritizing a second one or more beams or a second one or more antenna panels for the beam search procedure, where the second one or more beams or the second one or more antenna panels are not associated with the beam blockage as indicated by the beam blockage information. For example, the UE 120 may measure the second one or more beams and/or beams associated with the second one or more antenna panels earlier in time. This may improve a likelihood that these beams are selected for communications between the UE 120 and the network entity 705.

In some aspects, the UE 120 and/or the network entity 705 may select a beam, or beam pair, for communications between the UE 120 and the network entity 705 based at least in part on the RF sensing information. For example, the RF sensing information may be used to improve beam selections that are based at least in part on codebook information and/or previous beam measurements. Alternatively, the RF sensing information may be used as an additional input to a beam selection determination. For example, the UE 120 and/or the network entity 705 may provide one or more inputs to a neural network. The one or more inputs may include the RF sensing information and beam management information, among other examples. The beam management information may include a current serving beam pair, one or more previous serving beam pairs, and/or one or more beam measurements (e.g., an RSRP, signal-to-noise ratio (SNR), or another beam measurement), among other examples. The input(s) associated with the RF sensing information may include the inputs used by the sensing device 710 to detect the location and/or movement of the UE 120 or other objects, such as a channel estimation output derived from measuring sensing signals. Additionally, or alternatively, the input(s) associated with the RF sensing information may include the outputs of the RF sensing information, such as the location of the UE 120, movement information of the UE 120, and/or the environment map associated with the UE 120, among other examples. The UE 120 and/or the network entity 705 may select a communication parameter (e.g., a beam, a beam pair, and/or another communication parameter) based at least in part on an output of the neural network. For example, the output of the neural network may be a next beam or beam pair to be used by the UE 120 and/or the network entity 705. In some aspects, a feedback loop or reinforcement learning may be used to improve the neural network over time.

As shown by reference number 745, the UE 120 may communicate, with the network entity, using a communication parameter that is based at least in part on the RF sensing information. For example, the UE 120 may use a beam, a beam pair, a transmit power, an MCS, a quantity of resource blocks, a time domain resource allocation, and/or a frequency domain resource allocation, among other examples, that is selected based at least in part on the RF sensing information (e.g., as described in more detail elsewhere herein). For example, the UE 120 may receive, from the network entity 705, a downlink communication that uses the communication parameter. Additionally, or alternatively, the UE 120 may transmit, to the network entity 705, an uplink communication that uses the communication parameter.

As a result, the UE 120 and/or the network entity 705 may be enabled to adjust and/or modify a communication parameter (e.g., a beam, a transmit power, an MCS, a time domain resource allocation, and/or a frequency domain resource allocation, among other examples) used for communications between the UE 120 and the network entity 705 based at least in part on the RF sensing information (e.g., the movement information associated with the UE 120 and/or the environment information associated with the UE). As a result, the communication parameter may be selected based at least in part on the movement and/or orientation of the UE 120, thereby enabling the communication parameter to be selected to improve wireless communication metrics (e.g., signal strength and/or signal quality) of a connection between the UE 120 and the network entity 705 (e.g., before the wireless communication metrics degrade based at least in part on using a suboptimal communication parameter). This may improve a performance of the UE 120 and/or wireless communication metrics of a connection between the UE 120 and the network entity 705.

As indicated above, FIG. 7 is provided as an example. Other examples may differ from what is described with regard to FIG. 7.

Figure 8:
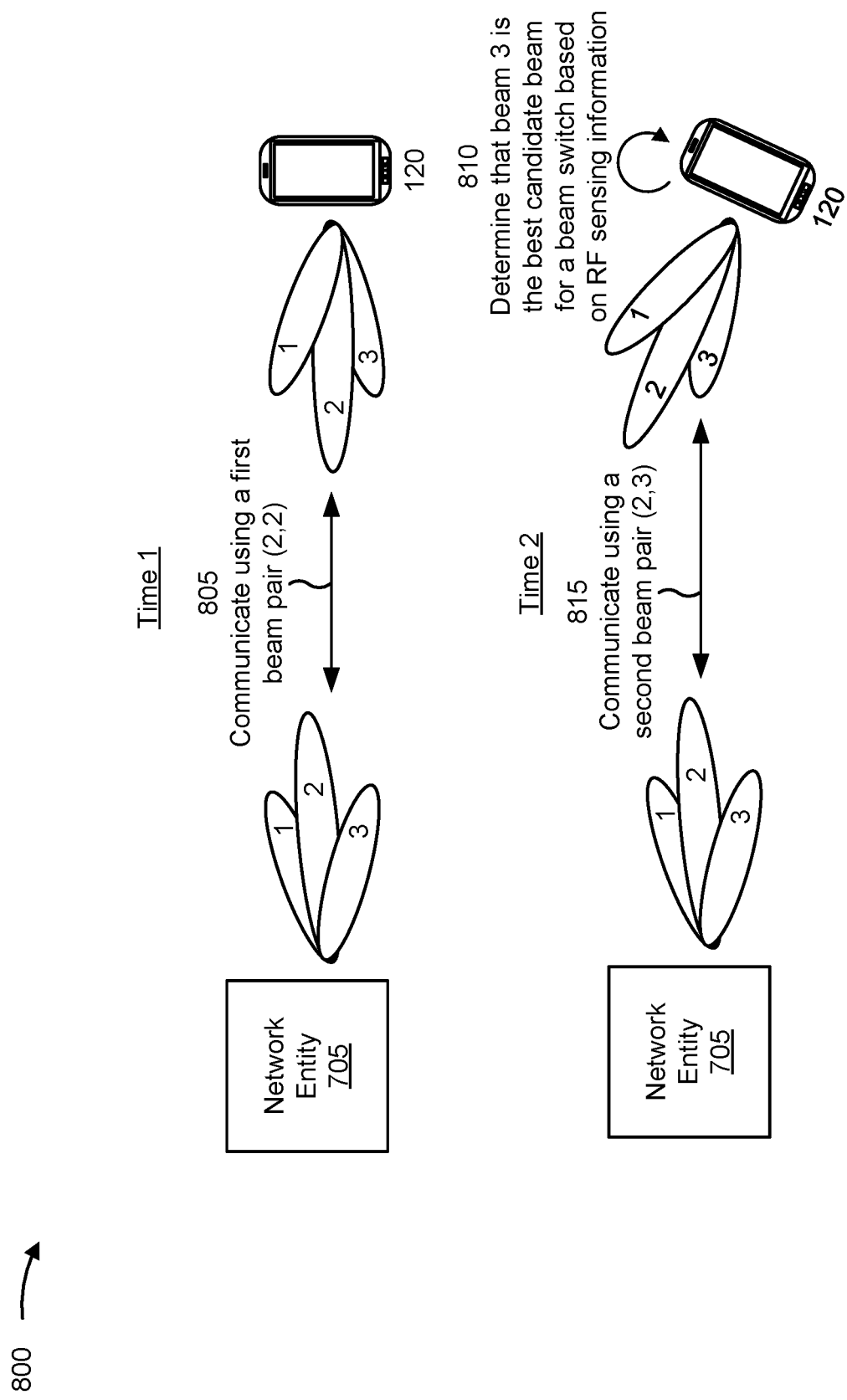
FIG. 8 is a diagram of an example associated with RF sensing assisted beam management, in accordance with the present disclosure.

FIG. 8 is a diagram of an example 800 associated with RF sensing assisted beam management, in accordance with the present disclosure. As shown in FIG. 8, the UE 120 and the network entity may communicate with one another using beams. For example, as shown by reference number 805, the UE 120 and the network entity 705 may communicate with one another using a first beam pair at a first time (e.g., time 1). For example, the network entity 705 may be associated with a first beam (shown as "1" in FIG. 8), a second beam (shown as "2" in FIG. 8), and a third beam (shown as "3" in FIG. 8), among other examples. Similarly, the UE 120 may be associated with a first beam (shown as "1" in FIG. 8), a second beam (shown as "2" in FIG. 8), and a third beam (shown as "3" in FIG. 8), among other examples. The first beam pair may include the second beam of the UE 120 and the second beam of the network entity 705. The quantity and/or arrangement of the beams associated with the UE 120 and the network entity 705 are provided as examples.

At a second time (e.g., time 2), the UE 120 may have a different orientation relative to the first time. For example, the UE 120 may have rotated and/or moved such that the orientation at the second time is different than an orientation of the UE 120 at the first time. The UE 120 may receive an indication of the new orientation of the UE 120 via RF sensing information (e.g., in a similar, or the same, manner as described in connection with FIG. 7). For example, the UE 120 may identify the orientation of the UE 120 relative to the network entity 705 based at least in part on the RF sensing information. As shown by reference number 810, the UE 120 may determine that the third beam (e.g., beam 3) of the UE 120 is the best candidate beam for a beam switch and/or beam search procedure based at least in part on the RF sensing information.

For example, the UE 120 may identify that the third beam is associated with a spatial direction toward to the network entity (e.g., based at least in part on the RF sensing information and beam codebook information stored by the UE 120). For example, the UE 120 may identify that, based at least in part on the orientation of the UE 120 at the second time, the third beam is now associated with a spatial direction toward the network entity 705 (e.g., rather than the second beam of the UE 120 as was the case at the first time). Therefore, the UE 120 may select the third beam, or prioritize the third beam, in a beam selection and/or a beam search procedure. For example, the UE 120 may measure the third beam first in time as part of a beam search procedure. This may increase a likelihood that the third beam is selected for communications with the network entity 705 and/or may reduce a latency associated with the beam search procedure. For example, without the assistance of the RF sensing information, the UE 120 may use a random or round-robin order to measure candidate beams associated with the beam search procedure. As a result, the UE 120 may measure the first beam, followed by the second beam, followed by the third beam. This may result in an increased latency until the third beam is measured by the UE 120. However, with the assistance of the RF sensing information, the UE 120 may measure the third beam first in time (e.g., earlier in time), thereby reducing a latency associated with measuring the beam that is associated with a spatial direction toward the network entity 705 (e.g., based at least in part on the current orientation of the UE 120 as indicated by the RF sensing information).

As shown by reference number 815, the UE 120 and the network entity 705 may communicate, at the second time, using a second beam pair (e.g., that may include the second beam of the network entity 705 and the third beam of the UE 120). As described above, the RF sensing information may enable the UE 120 and/or the network entity to switch to the second beam pair before communication metrics associated with the first beam pair degrade and/or before a failure associated with the first beam pair. Additionally, the RF sensing information may enable the UE 120 and/or the network entity to identify the best beam pair (e.g., the second beam pair) quicker based at least in part on the orientation of the UE 120 at the second time.

As indicated above, FIG. 8 is provided as an example. Other examples may differ from what is described with regard to FIG. 8.

FIG. 9 is a diagram illustrating an example process 900 performed, for example, by a UE, in accordance with the present disclosure. Example process 900 is an example where the UE (e.g., UE 120) performs operations associated with RF sensing assisted wireless communication. In some other aspects, the process 900 may be similarly performed by a network entity (e.g., the base station 110, a CU, a DU, and/or an RU).

As shown in FIG. 9, in some aspects, process 900 may include obtaining RF sensing information indicating at least one of movement information associated with the UE or environment information associated with the UE (block 910). For example, the UE (e.g., using communication manager 140, reception component 1102, and/or RF sensing component 1108, depicted in FIG. 11) may obtain radio RF sensing information indicating at least one of movement information associated with the UE or environment information associated with the UE, as described above.

As further shown in FIG. 9, in some aspects, process 900 may include communicating, with a network entity, using a communication parameter that is based at least in part on the RF sensing information (block 920). For example, the UE (e.g., using communication manager 140 reception component 1102, and/or transmission component 1104, depicted in FIG. 11) may communicate, with a network entity, using a communication parameter that is based at least in part on the RF sensing information, as described above.

Process 900 may include additional aspects, such as any single aspect or any combination of aspects described below and/or in connection with one or more other processes described elsewhere herein.

In a first aspect, process 900 includes measuring a candidate beam that is selected based at least in part on at least one of the RF sensing information or the communication parameter.

In a second aspect, alone or in combination with the first aspect, the RF sensing information is Wi-Fi sensing information.

In a third aspect, alone or in combination with one or more of the first and second aspects, the communication parameter includes a beam, wherein the movement information indicates at least one of a rotation of the UE or a movement of the UE, and process 900 includes communicating, with the network entity prior to obtaining the RF sensing information, using another beam, and measuring the beam as part of a beam search procedure, wherein the beam is selected for the beam search procedure based at least in part on the rotation or the movement of the UE and codebook information stored by the UE.

In a fourth aspect, alone or in combination with one or more of the first through third aspects, the communication parameter includes a beam, wherein the RF sensing information includes beam blockage information, and process 900 includes performing an action to mitigate a beam blockage based at least in part on the beam blockage information.

In a fifth aspect, alone or in combination with one or more of the first through fourth aspects, the action includes at least one of removing one or more beam measurements from a beam measurement database and initiating a beam search procedure, refraining from performing beam measurements of a first one or more beams or using a first one or more antenna panels, wherein the first one or more beams or the first one or more antenna panels are associated with the beam blockage as indicated by the beam blockage information, or prioritizing a second one or more beams or a second one or more antenna panels for the beam search procedure, wherein the second one or more beams or the second one or more antenna panels are not associated with the beam blockage as indicated by the beam blockage information.

In a sixth aspect, alone or in combination with one or more of the first through fifth aspects, the beam blockage information includes a beam blockage prediction.

In a seventh aspect, alone or in combination with one or more of the first through sixth aspects, the beam blockage information is associated with at least one of a static beam blockage or a dynamic beam blockage.

In an eighth aspect, alone or in combination with one or more of the first through seventh aspects, the beam blockage information indicates a predicted blockage associated with a body part of a user of the UE.

In a ninth aspect, alone or in combination with one or more of the first through eighth aspects, the beam blockage information indicates a predicted blockage associated with an object located proximate to the UE.

In a tenth aspect, alone or in combination with one or more of the first through ninth aspects, the beam blockage information is based at least in part on a location of the network entity, a location of the UE, and the RF sensing information.

In an eleventh aspect, alone or in combination with one or more of the first through tenth aspects, process 900 includes selecting the communication parameter based at least in part on the RF sensing information.

In a twelfth aspect, alone or in combination with one or more of the first through eleventh aspects, the communication parameter includes a beam, and selecting the communication parameter comprises providing one or more inputs to a neural network, wherein the one or more inputs include the RF sensing information and beam management information, and selecting the beam based at least in part on an output of the neural network.

In a thirteenth aspect, alone or in combination with one or more of the first through twelfth aspects, the beam management information includes at least one of a current serving beam pair, one or more previous serving beam pairs, or one or more beam measurements.

In a fourteenth aspect, alone or in combination with one or more of the first through thirteenth aspects, obtaining the RF sensing information comprises receiving, from a device, the RF sensing information.

In a fifteenth aspect, alone or in combination with one or more of the first through fourteenth aspects, the device is a WLAN access point.

In a sixteenth aspect, alone or in combination with one or more of the first through fifteenth aspects, the RF sensing information is included in a WLAN control channel message.

In a seventeenth aspect, alone or in combination with one or more of the first through sixteenth aspects, obtaining the RF sensing information includes performing RF sensing to obtain the RF sensing information.

In an eighteenth aspect, alone or in combination with one or more of the first through seventeenth aspects, the communication parameter includes at least one of a beam, a time domain resource allocation, a frequency domain resource allocation, a transmit power level, one or more resource blocks, or a modulation and coding scheme.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, by a device, in accordance with the present disclosure. Example process 1000 is an example where the device (e.g., the sensing device 710, the sensing device 160, or the UE 120) performs operations associated with RF sensing assisted wireless communication.

As shown in FIG. 10, in some aspects, process 1000 may include performing RF sensing to obtain RF sensing information associated with an environment of a UE, wherein the RF sensing information indicates at least one of movement information associated with the UE or environment information associated with the UE (block 1010). For example, the device (e.g., using communication manager 180 and/or RF sensing component 1208, depicted in FIG. 12) may perform RF sensing to obtain RF sensing information associated with an environment of a UE, wherein the RF sensing information indicates at least one of movement information associated with the UE or environment information associated with the UE, as described above.

As further shown in FIG. 10, in some aspects, process 1000 may include transmitting, to the UE or a network entity, the RF sensing information to facilitate communication management between the UE and the network entity (block 1020). For example, the device (e.g., using communication manager 180 and/or transmission component 1204, depicted in FIG. 12) may transmit, to the UE or a network entity, the RF sensing information to facilitate communication management between the UE and the network entity, as described above.

Process 1000 may include additional aspects, such as any single aspect or any combination of aspects described below and/or in connection with one or more other processes described elsewhere herein.

In a first aspect, the RF sensing information is Wi-Fi sensing information.

In a second aspect, alone or in combination with the first aspect, the movement information indicates at least one of a rotation of the UE or a movement of the UE.

In a third aspect, alone or in combination with one or more of the first and second aspects, the RF sensing information includes beam blockage information.

In a fourth aspect, alone or in combination with one or more of the first through third aspects, performing the RF sensing comprises performing the RF sensing to obtain an environment map associated with the environment of the UE, wherein the beam blockage information is based at least in part on the environment map.

In a fifth aspect, alone or in combination with one or more of the first through fourth aspects, performing the RF sensing comprises performing, according to a periodic schedule, RF sensing to track objects in the environment and a location of the UE, or an orientation of the UE, and identifying a beam blockage based at least in part on the objects in the environment, the location of the UE, the orientation of the UE, and an environment map associated with the environment of the UE, wherein the beam blockage information indicates the beam blockage.

In a sixth aspect, alone or in combination with one or more of the first through fifth aspects, the beam blockage information includes a timing of a predicted beam blockage.

In a seventh aspect, alone or in combination with one or more of the first through sixth aspects, the beam blockage information includes a beam blockage prediction.

In an eighth aspect, alone or in combination with one or more of the first through seventh aspects, the beam blockage information is associated with at least one of a static beam blockage or a dynamic beam blockage.

In a ninth aspect, alone or in combination with one or more of the first through eighth aspects, the beam blockage information indicates a predicted blockage associated with a body part of a user of the UE.

In a tenth aspect, alone or in combination with one or more of the first through ninth aspects, the beam blockage information indicates a predicted blockage associated with an object located proximate to the UE.

In an eleventh aspect, alone or in combination with one or more of the first through tenth aspects, the beam blockage information is based at least in part on a location of the network entity, a location of the UE, and the RF sensing information.

In a twelfth aspect, alone or in combination with one or more of the first through eleventh aspects, process 1000 includes receiving, from the UE or the network entity, an indication of the location of the network entity.

In a thirteenth aspect, alone or in combination with one or more of the first through twelfth aspects, the device is a WLAN access point or the UE.

In a fourteenth aspect, alone or in combination with one or more of the first through thirteenth aspects, transmitting the RF sensing information comprises transmitting, to the UE, the RF sensing information in a WLAN control channel message.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
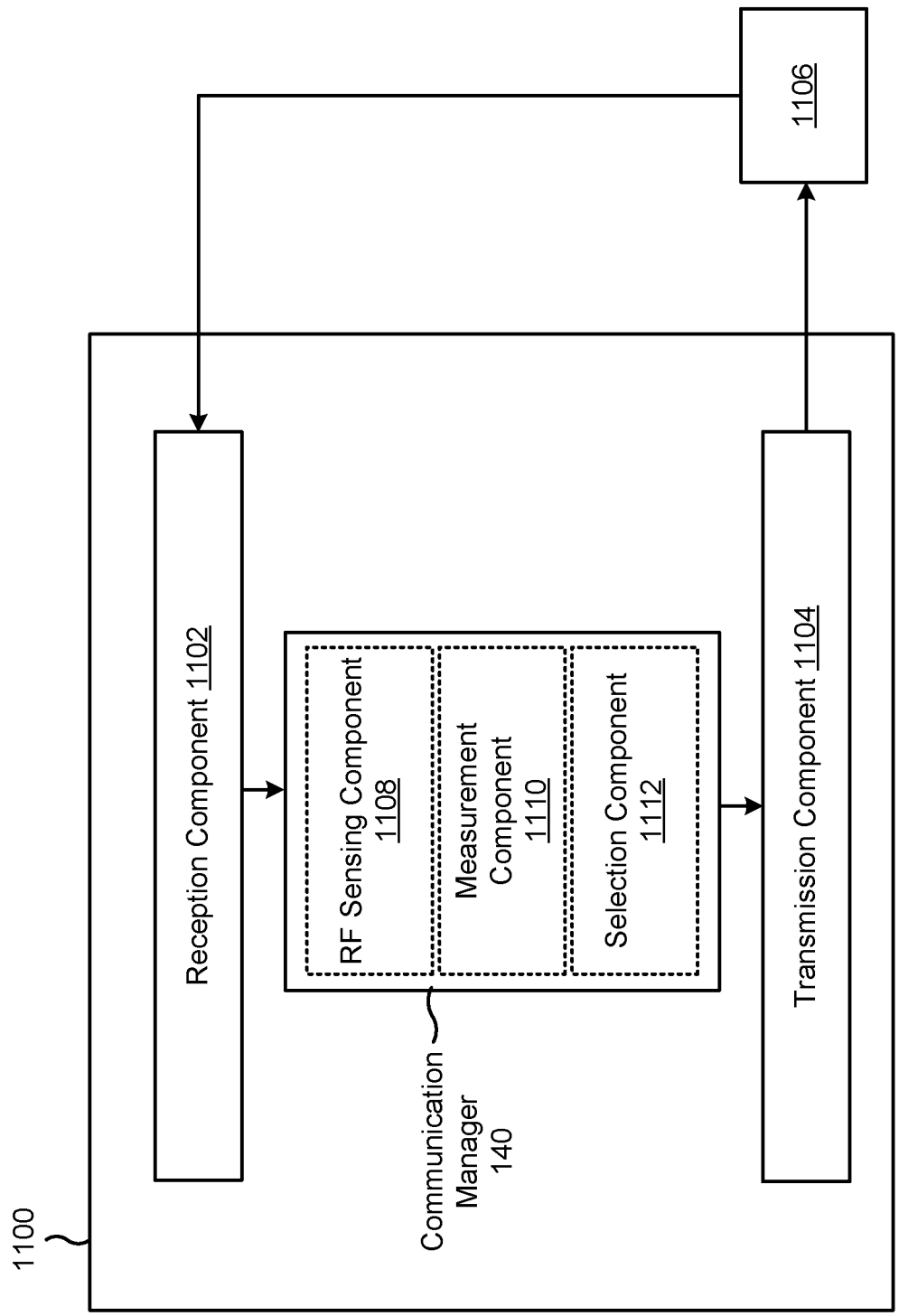
FIG. 11 is a diagram of an example apparatus for wireless communication, in accordance with the present disclosure.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include one or more of an RF sensing component 1108, a measurement component 1110, and/or a selection component 1112, among other examples.

In some aspects, the apparatus 1100 may be configured to perform one or more operations described herein in connection with FIGS. 7 and 8. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The RF sensing component 1108 may obtain RF sensing information indicating at least one of movement information associated with the UE or environment information associated with the UE. The reception component 1102 and/or the transmission component 1104 may communicate, with a network entity, using a communication parameter that is based at least in part on the RF sensing information.

The measurement component 1110 may measure a candidate beam that is selected based at least in part on at least one of the RF sensing information or the communication parameter.

The selection component 1112 may select the communication parameter based at least in part on the RF sensing information.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
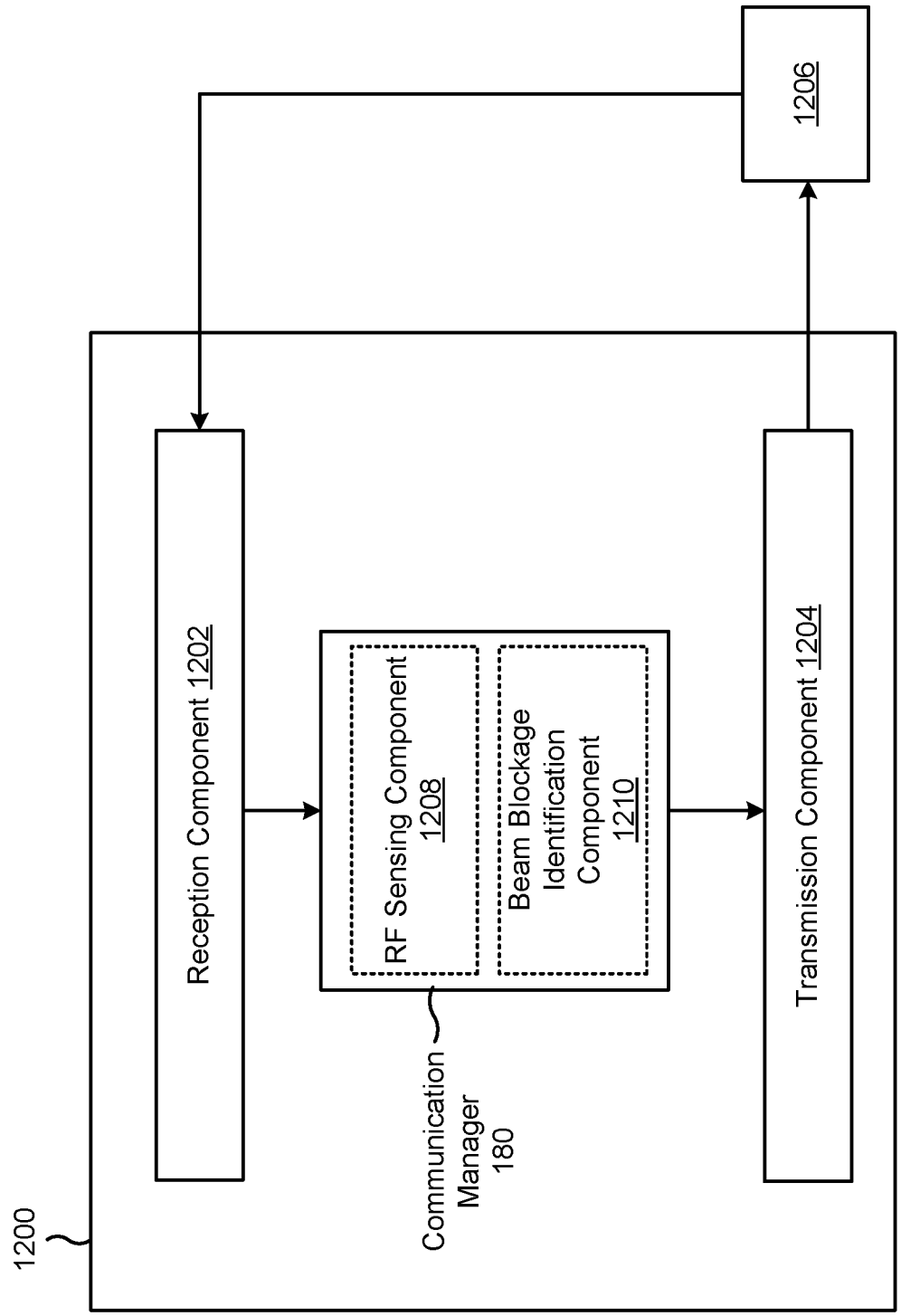
FIG. 12 is a diagram of an example apparatus for wireless communication, in accordance with the present disclosure.

FIG. 12 is a diagram of an example apparatus 1200 for wireless communication. The apparatus 1200 may be a sensing device, or a sensing device may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 180. The communication manager 180 may include one or more of an RF sensing component 1208 or a beam blockage identification component 1210, among other examples.

In some aspects, the apparatus 1200 may be configured to perform one or more operations described herein in connection with FIGS. 7 and 8. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the sensing device described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the sensing device described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/ processor, a memory, or a combination thereof, of the sensing device described in connection with FIG. 2. In some aspects, the transmission component 1204 may be co-located with the reception component 1202 in a transceiver.

The RF sensing component 1208 may perform RF sensing to obtain RF sensing information associated with an environment of a UE, wherein the RF sensing information indicates at least one of movement information associated with the UE or environment information associated with the UE. The transmission component 1204 may transmit, to the UE or a network entity, the RF sensing information to facilitate communication management between the UE and the network entity.

The beam blockage identification component 1210 may identify a beam blockage associated with the UE based at least in part on the RF sensing information.

The reception component 1202 may receive, from the UE or the network entity, an indication of the location of the network entity.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
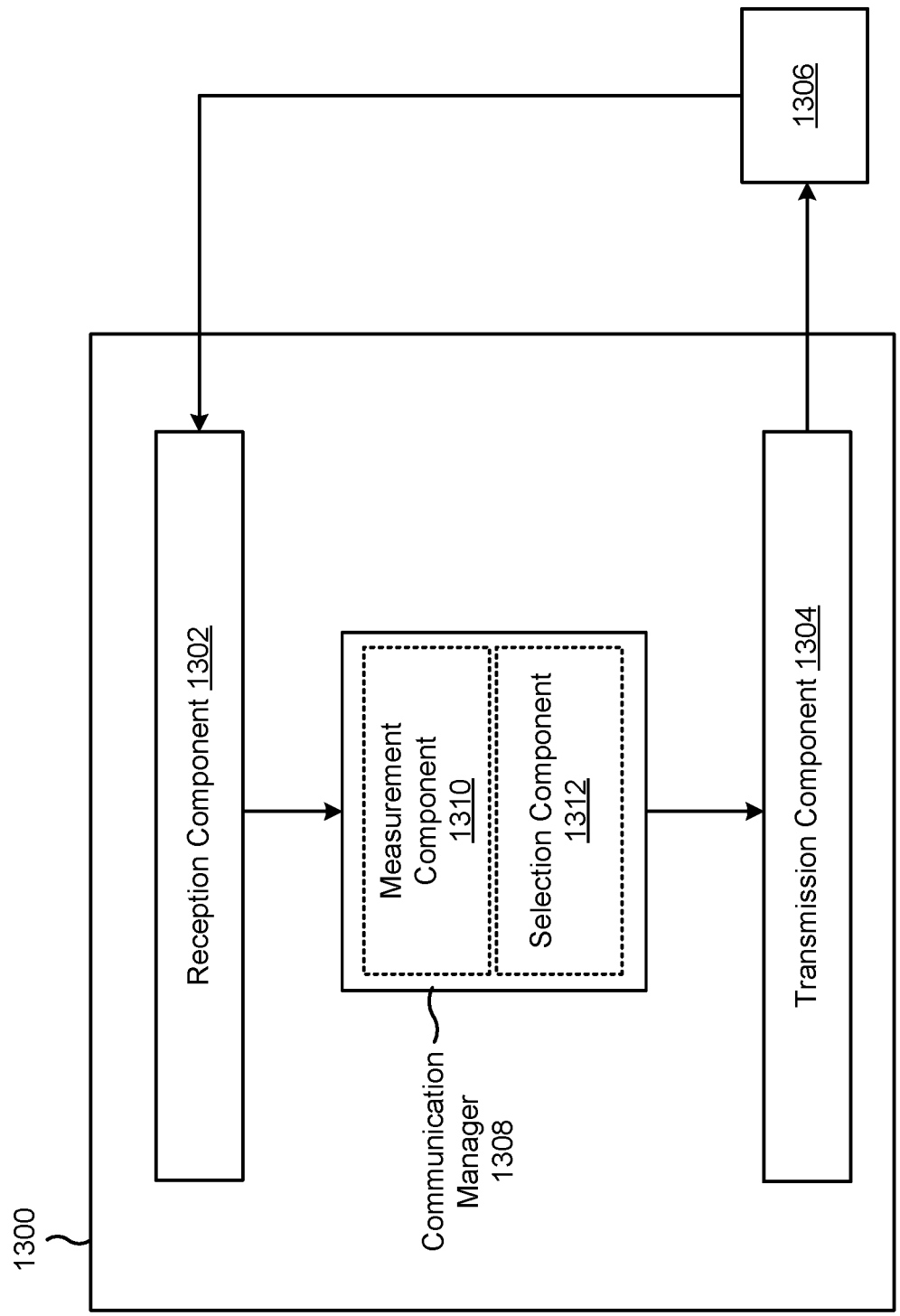
FIG. 13 is a diagram of an example apparatus for wireless communication, in accordance with the present disclosure.

FIG. 13 is a diagram of an example apparatus 1300 for wireless communication. The apparatus 1300 may be a network entity, or a network entity may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 1308. The communication manager 1308 may be, or be similar to, the communication manager 150 depicted in FIGS. 1 and 2. For example, in some aspects, the communication manager 1308 may be configured to perform one or more of the functions described as being performed by the communication manager 150. In some aspects, the communication manager 1308 may include the reception component 1302 or the transmission component 1304. The communication manager 1308 may include one or more of a measurement component 1310 and/or a selection component 1312, among other examples.

In some aspects, the apparatus 1300 may be configured to perform one or more operations described herein in connection with FIGS. 7 and 8. Additionally, or alternatively, the apparatus 1300 may be configured to perform one or more processes described herein, or a combination thereof. In some aspects, the apparatus 1300 and/or one or more components shown in FIG. 13 may include one or more components of the network entity described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the network entity described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/ processor, a memory, or a combination thereof, of the network entity described in connection with FIG. 2. In some aspects, the transmission component 1304 may be co-located with the reception component 1302 in a transceiver.

The reception component 1302 may receive RF sensing information indicating at least one of movement information associated with a UE or environment information associated with the UE. The reception component 1302 and/or the transmission component 1304 may communicate, with the UE, using a communication parameter that is based at least in part on the RF sensing information.

The measurement component 1310 may measure a candidate beam that is selected based at least in part on at least one of the RF sensing information or the communication parameter.

The selection component 1312 may select the communication parameter based at least in part on the RF sensing information.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: obtaining radio frequency (RF) sensing information indicating at least one of movement information associated with the UE or environment information associated with the UE; and communicating, with a network entity, using a communication parameter that is based at least in part on the RF sensing information.

Aspect 2: The method of Aspect 1, further comprising: measuring a candidate beam that is selected based at least in part on at least one of the RF sensing information or the communication parameter.

Aspect 3: The method of any of Aspects 1-2, wherein the RF sensing information is Wi-Fi sensing information.

Aspect 4: The method of any of Aspects 1-3, wherein the communication parameter includes a beam, wherein the movement information indicates at least one of a rotation of the UE or a movement of the UE, the method further comprising: communicating, with the network entity prior to obtaining the RF sensing information, using another beam; and measuring the beam as part of a beam search procedure, wherein the beam is selected for the beam search procedure based at least in part on the rotation or the movement of the UE and codebook information stored by the UE.

Aspect 5: The method of any of Aspects 1-4, wherein the communication parameter includes a beam, wherein the RF sensing information includes beam blockage information, the method further comprising: performing an action to mitigate a beam blockage based at least in part on the beam blockage information.

Aspect 6: The method of Aspect 5, wherein the action includes at least one of: removing one or more beam measurements from a beam measurement database and initiating a beam search procedure; refraining from performing beam measurements of a first one or more beams or using a first one or more antenna panels, wherein the first one or more beams or the first one or more antenna panels are associated with the beam blockage as indicated by the beam blockage information; or prioritizing a second one or more beams or a second one or more antenna panels for the beam search procedure, wherein the second one or more beams or the second one or more antenna panels are not associated with the beam blockage as indicated by the beam blockage information.

Aspect 7: The method of any of Aspects 5-6, wherein the beam blockage information includes a beam blockage prediction.

Aspect 8: The method of any of Aspects 5-7, wherein the beam blockage information is associated with at least one of a static beam blockage or a dynamic beam blockage.

Aspect 9: The method of any of Aspects 5-8, wherein the beam blockage information indicates a predicted blockage associated with a body part of a user of the UE.

Aspect 10: The method of any of Aspects 5-9, wherein the beam blockage information indicates a predicted blockage associated with an object located proximate to the UE.

Aspect 11: The method of any of Aspects 5-10, wherein the beam blockage information is based at least in part on a location of the network entity, a location of the UE, and the RF sensing information.

Aspect 12: The method of any of Aspects 1-11, further comprising: selecting the communication parameter based at least in part on the RF sensing information.

Aspect 13: The method of Aspect 12, wherein the communication parameter includes a beam, and wherein selecting the communication parameter comprises: providing one or more inputs to a neural network, wherein the one or more inputs include the RF sensing information and beam management information; and selecting the beam based at least in part on an output of the neural network.

Aspect 14: The method of Aspect 13, wherein the beam management information includes at least one of: a current serving beam pair, one or more previous serving beam pairs, or one or more beam measurements.

Aspect 15: The method of any of Aspects 1-14, wherein obtaining the RF sensing information comprises: receiving, from a device, the RF sensing information.

Aspect 16: The method of Aspect 15, wherein the device is a wireless local area network (WLAN) access point.

Aspect 17: The method of any of Aspects 15-16, wherein the RF sensing information is included in a wireless local area network (WLAN) control channel message.

Aspect 18: The method of any of Aspects 1-14, wherein obtaining the RF sensing information comprises: performing RF sensing to obtain the RF sensing information.

Aspect 19: The method of any of Aspects 1-18, wherein the communication parameter includes at least one of: a beam, a time domain resource allocation, a frequency domain resource allocation, a transmit power level, one or more resource blocks, or a modulation and coding scheme.

Aspect 20: A method of wireless communication performed by a device, comprising: performing radio frequency (RF) sensing to obtain RF sensing information associated with an environment of a user equipment (UE), wherein the RF sensing information indicates at least one of movement information associated with the UE or environment information associated with the UE; and transmitting, to the UE or a network entity, the RF sensing information to facilitate communication management between the UE and the network entity.

Aspect 21: The method of Aspect 20, wherein the RF sensing information is Wi-Fi sensing information.

Aspect 22: The method of any of Aspects 20-21, wherein the movement information indicates at least one of a rotation of the UE or a movement of the UE.

Aspect 23: The method of any of Aspects 20-22, wherein the RF sensing information includes beam blockage information.

Aspect 24: The method of Aspect 23, wherein performing the RF sensing comprises: performing the RF sensing to obtain an environment map associated with the environment of the UE, wherein the beam blockage information is based at least in part on the environment map.

Aspect 25: The method of any of Aspects 23-24, wherein performing the RF sensing comprises: performing, according to a periodic schedule, RF sensing to track objects in the environment and a location of the UE, or an orientation of the UE; and identifying a beam blockage based at least in part on the objects in the environment, the location of the UE, the orientation of the UE, and an environment map associated with the environment of the UE, wherein the beam blockage information indicates the beam blockage.

Aspect 26: The method of any of Aspects 23-25, wherein the beam blockage information includes a timing of a predicted beam blockage.

Aspect 27: The method of any of Aspects 23-26, wherein the beam blockage information includes a beam blockage prediction.

Aspect 28: The method of any of Aspects 23-27, wherein the beam blockage information is associated with at least one of a static beam blockage or a dynamic beam blockage.

Aspect 29: The method of any of Aspects 23-28, wherein the beam blockage information indicates a predicted blockage associated with a body part of a user of the UE.

Aspect 30: The method of any of Aspects 23-29, wherein the beam blockage information indicates a predicted blockage associated with an object located proximate to the UE.

Aspect 31: The method of any of Aspects 23-30, wherein the beam blockage information is based at least in part on a location of the network entity, a location of the UE, and the RF sensing information.

Aspect 32: The method of Aspect 31, further comprising: receiving, from the UE or the network entity, an indication of the location of the network entity.

Aspect 33: The method of any of Aspects 20-32, wherein the device is a wireless local area network (WLAN) access point or the UE.

Aspect 34: The method of any of Aspects 20-33, wherein transmitting the RF sensing information comprises: transmitting, to the UE, the RF sensing information in a wireless local area network (WLAN) control channel message.

Aspect 35: An apparatus for wireless communication at a device, comprising a processor; memory coupled with the processor; and instructions stored in the memory and executable by the processor to cause the apparatus to perform the method of one or more of Aspects 1-19.

Aspect 36: A device for wireless communication, comprising a memory and one or more processors coupled to the memory, the one or more processors configured to perform the method of one or more of Aspects 1-19.

Aspect 37: An apparatus for wireless communication, comprising at least one means for performing the method of one or more of Aspects 1-19.

Aspect 38: A non-transitory computer-readable medium storing code for wireless communication, the code comprising instructions executable by a processor to perform the method of one or more of Aspects 1-19.

Aspect 39: A non-transitory computer-readable medium storing a set of instructions for wireless communication, the set of instructions comprising one or more instructions that, when executed by one or more processors of a device, cause the device to perform the method of one or more of Aspects 1-19.

Aspect 40: An apparatus for wireless communication at a device, comprising a processor; memory coupled with the processor; and instructions stored in the memory and executable by the processor to cause the apparatus to perform the method of one or more of Aspects 20-34.

Aspect 41: A device for wireless communication, comprising a memory and one or more processors coupled to the memory, the one or more processors configured to perform the method of one or more of Aspects 20-34.

Aspect 42: An apparatus for wireless communication, comprising at least one means for performing the method of one or more of Aspects 20-34.

Aspect 43: A non-transitory computer-readable medium storing code for wireless communication, the code comprising instructions executable by a processor to perform the method of one or more of Aspects 20-34.

Aspect 44: A non-transitory computer-readable medium storing a set of instructions for wireless communication, the set of instructions comprising one or more instructions that, when executed by one or more processors of a device, cause the device to perform the method of one or more of Aspects 20-34.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, configured to:
obtain, from a device, radio frequency (RF) sensing information included in a wireless local area network (WLAN) control channel message, the RF sensing information indicating at least one of movement information associated with the UE or environment information associated with the UE;
transmit, to a network entity via a physical uplink shared channel message, an indication of the RF sensing information; and
communicate, with the network entity, using a communication parameter that is based at least in part on the RF sensing information.

2. The UE of claim 1, wherein the one or more processors are further configured to:
measure a candidate beam that is selected based at least in part on at least one of the RF sensing information or the communication parameter.

3. The UE of claim 1, wherein the communication parameter includes a beam, wherein the movement information indicates at least one of a rotation of the UE or a movement of the UE, and wherein the one or more processors are further configured to:
communicate, with the network entity prior to obtaining the RF sensing information, using another beam; and
measure the beam as part of a beam search procedure, wherein the beam is selected for the beam search procedure based at least in part on the rotation or the movement of the UE and codebook information stored by the UE.

4. The UE of claim 1, wherein the communication parameter includes a beam, wherein the RF sensing information includes beam blockage information, and wherein the one or more processors are further configured to:
perform an action to mitigate a beam blockage based at least in part on the beam blockage information.

5. The UE of claim 4, wherein the action includes at least one of:
remove one or more beam measurements from a beam measurement database and initiating a beam search procedure;
refrain from performing beam measurements of a first one or more beams or using a first one or more antenna panels, wherein the first one or more beams or the first one or more antenna panels are associated with the beam blockage as indicated by the beam blockage information; or
prioritize a second one or more beams or a second one or more antenna panels for the beam search procedure, wherein the second one or more beams or the second one or more antenna panels are not associated with the beam blockage as indicated by the beam blockage information.

6. The UE of claim 4, wherein the beam blockage information indicates at least one of:
a beam blockage prediction,
a static beam blockage or a dynamic beam blockage,
a predicted blockage associated with a body part of a user of the UE, or
a predicted blockage associated with an object located proximate to the UE.

7. The UE of claim 4, wherein the beam blockage information is based at least in part on a location of the network entity, a location of the UE, and the RF sensing information.

8. The UE of claim 1, wherein the one or more processors are further configured to:
select the communication parameter based at least in part on the RF sensing information.

9. The UE of claim 8, wherein the communication parameter includes a beam, and wherein the one or more processors, to select the communication parameter, are configured to:
provide one or more inputs to a neural network, wherein the one or more inputs include the RF sensing information and beam management information; and
select the beam based at least in part on an output of the neural network.

10. The UE of claim 1, wherein the communication parameter includes at least one of:
a beam,
a time domain resource allocation,
a frequency domain resource allocation,
a transmit power level,
one or more resource blocks, or
a modulation and coding scheme.

11. The UE of claim 1, wherein the device is a WLAN access point supporting a cell corresponding to a particular local area network.

12. The UE of claim 1, wherein the one or more processors are further configured to:
transmit, to the network entity via a physical uplink control channel message, a set of one or more capabilities supported by the UE, the UE indicating support for RF sensing assisted wireless communication in accordance with establishing a communication connection with the device.

13. A device for wireless communication, comprising:
one or more memories; and
one or more processors, coupled to the one or more memories, configured to:
receive information to facilitate radio frequency (RF) sensing associated with a user equipment (UE), the information including at least one of: an identifier associated with a network entity, or a cell identifier of a cell associated with the network entity;
perform RF sensing to obtain RF sensing information associated with an environment of the UE, wherein the RF sensing information indicates at least one of movement information associated with the UE or environment information associated with the UE; and
transmit, to the UE or the network entity, the RF sensing information to facilitate communication management between the UE and the network entity, wherein the RF sensing information is transmitted in a wireless local area network (WLAN) control channel message.

14. The device of claim 13, wherein the movement information indicates at least one of a rotation of the UE or a movement of the UE.

15. The device of claim 13, wherein the RF sensing information includes beam blockage information, and wherein the one or more processors, to perform the RF sensing, are configured to:
perform the RF sensing to obtain an environment map associated with the environment of the UE, wherein the beam blockage information is based at least in part on the environment map.

16. A method of wireless communication performed by a user equipment (UE), comprising:
obtaining, from a device, radio frequency (RF) sensing information included in a wireless local area network (WLAN) control channel message, the RF sensing information indicating at least one of movement information associated with the UE or environment information associated with the UE;
transmitting, to a network entity via a physical uplink shared channel message, an indication of the RF sensing information; and
communicating, with the network entity, using a communication parameter that is based at least in part on the RF sensing information.

17. The method of claim 16, further comprising:
measuring a candidate beam that is selected based at least in part on at least one of the RF sensing information or the communication parameter.

18. The method of claim 16, wherein the communication parameter includes a beam, wherein the movement information indicates at least one of a rotation of the UE or a movement of the UE, the method further comprising:
communicating, with the network entity prior to obtaining the RF sensing information, using another beam; and
measuring the beam as part of a beam search procedure, wherein the beam is selected for the beam search procedure based at least in part on the rotation or the movement of the UE and codebook information stored by the UE.

19. The method of claim 16, wherein the communication parameter includes a beam, wherein the RF sensing information includes beam blockage information, the method further comprising:
performing an action to mitigate a beam blockage based at least in part on the beam blockage information.

20. The method of claim 19, wherein the action includes at least one of:
removing one or more beam measurements from a beam measurement database and initiating a beam search procedure;
refraining from performing beam measurements of a first one or more beams or using a first one or more antenna panels, wherein the first one or more beams or the first one or more antenna panels are associated with the beam blockage as indicated by the beam blockage information; or
prioritizing a second one or more beams or a second one or more antenna panels for the beam search procedure, wherein the second one or more beams or the second one or more antenna panels are not associated with the beam blockage as indicated by the beam blockage information.

21. The method of claim 19, wherein the beam blockage information indicates at least one of:
a beam blockage prediction,
a static beam blockage or a dynamic beam blockage,
a predicted blockage associated with a body part of a user of the UE, or
a predicted blockage associated with an object located proximate to the UE.

22. The method of claim 19, wherein the beam blockage information is based at least in part on a location of the network entity, a location of the UE, and the RF sensing information.

23. The method of claim 16, further comprising:
selecting the communication parameter based at least in part on the RF sensing information.

24. The method of claim 23, wherein selecting the communication parameter comprises:
providing one or more inputs to a neural network, wherein the one or more inputs include the RF sensing information and beam management information; and
selecting the communication parameter based at least in part on an output of the neural network.

25. The method of claim 16, wherein the communication parameter includes at least one of:
a beam,
a time domain resource allocation,
a frequency domain resource allocation,
a transmit power level,
one or more resource blocks, or
a modulation and coding scheme.

26. The method of claim 16, wherein the device is a wireless local area network (WLAN) access point supporting a cell corresponding to a particular local area network.

27. The method of claim 16, further comprising:
transmitting, to the network entity via a physical uplink control channel message, a set of one or more capabilities supported by the UE, the UE indicating support for RF sensing assisted wireless communication in accordance with establishing a communication connection with the device.

28. A method of wireless communication performed by a device, comprising:
receiving, from a user equipment (UE), information to facilitate radio frequency (RF) sensing associated with the UE, the information including at least one of: an identifier associated with a network entity, or a cell identifier of a cell associated with the network entity;
performing RF sensing to obtain RF sensing information associated with an environment of the UE, wherein the RF sensing information indicates at least one of movement information associated with the UE or environment information associated with the UE; and
transmitting, to the UE or the network entity, the RF sensing information to facilitate communication management between the UE and the network entity, wherein the RF sensing information is transmitted in a wireless local area network (WLAN) control channel message.

29. The method of claim 28, wherein the movement information indicates at least one of a rotation of the UE or a movement of the UE.

30. The method of claim 28, wherein the RF sensing information includes beam blockage information, and wherein performing the RF sensing comprises:
performing the RF sensing to obtain an environment map associated with the environment of the UE, wherein the beam blockage information is based at least in part on the environment map.

* * * * *